(12) United States Patent
Kishimoto et al.

(10) Patent No.: US 6,396,559 B1
(45) Date of Patent: May 28, 2002

(54) LCD INCLUDING SPACERS USED IN COMBINATION WITH POLYMER WALLS

(75) Inventors: Katsuhiko Kishimoto; Kenji Hamada, both of Nara-ken; Nobuaki Yamada, Osaka, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/441,940

(22) Filed: Nov. 17, 1999

(30) Foreign Application Priority Data

| Nov. 17, 1998 | (JP) | 10-327284 |
| Jan. 26, 1999 | (JP) | 11-017703 |
| Apr. 28, 1999 | (JP) | 11-123167 |
| Jul. 15, 1999 | (JP) | 11-202365 |

(51) Int. Cl.⁷ ................. G02F 1/1339; G02F 1/1337
(52) U.S. Cl. ................. 349/156; 349/123; 349/155
(58) Field of Search ................. 349/155, 156, 349/123; 345/88

(56) References Cited

U.S. PATENT DOCUMENTS

| 5,729,312 A | * | 3/1998 | Yamagishi et al. | 349/86 |
| 5,978,064 A | * | 11/1999 | Nishiguchi | 349/156 |
| 5,995,190 A | * | 11/1999 | Nagae et al. | 349/156 |
| 6,040,888 A | * | 3/2000 | Masami et al. | 349/155 |
| 6,091,476 A | * | 7/2000 | Sakai et al. | 349/155 |
| 6,115,098 A | * | 9/2000 | Kume et al. | 349/156 |
| 6,140,988 A | * | 10/2000 | Yamada et al. | 345/88 |
| 6,154,267 A | * | 11/2000 | Kondo et al. | 349/156 |
| 6,175,398 B1 | * | 1/2001 | Yamada et al. | 349/96 |
| 6,181,406 B1 | * | 1/2001 | Morimoto et al. | 349/155 |
| 6,187,440 B1 | * | 2/2001 | Wu | 428/407 |

FOREIGN PATENT DOCUMENTS

| JP | 6-273735 A | 9/1994 |
| JP | 6-301015 A | 10/1994 |
| JP | 7-120728 A | 5/1995 |
| JP | 9-197384 A | 7/1997 |
| JP | 10-186330 A | 7/1998 |

OTHER PUBLICATIONS

Kume et al; 09/270,752, filed Mar. 7, 1999, entitled "Liquid Crystal Display Device, and Method for Producing the Same".

Kishimoto et al; 09/329,237, filed Jun. 10, 1999, entitled "Liquid Crystal Display Device and Method for Manufacturing the Same".

* cited by examiner

*Primary Examiner*—William L. Sikes
*Assistant Examiner*—Tarifur R. Chowdhury
(74) *Attorney, Agent, or Firm*—Nixon & Vanderhye P.C.

(57) ABSTRACT

A liquid crystal display device of the present invention includes: a pair of substrates; a liquid crystal layer interposed between the pair of substrates; and a polymer wall formed on one of the pair of substrates. A thickness of the liquid crystal layer is defined by spacer beads to be greater than a height of the polymer wall.

15 Claims, 28 Drawing Sheets

(1 of 28 Drawing Sheet(s) Filed in Color)

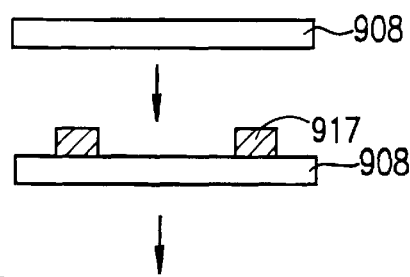
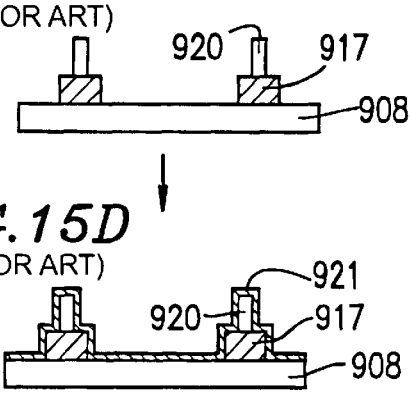
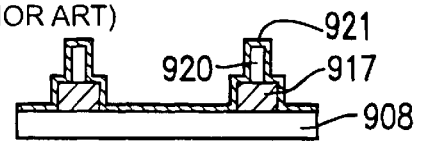
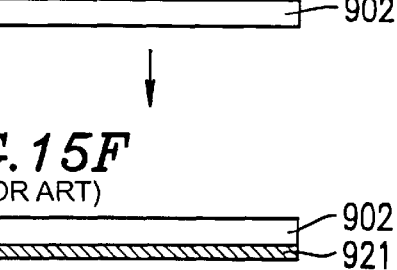
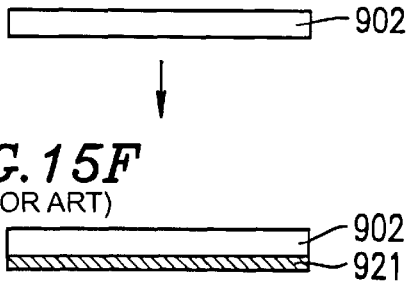
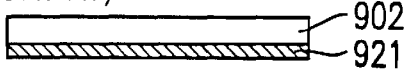
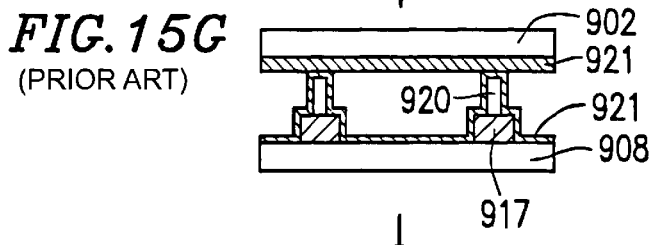
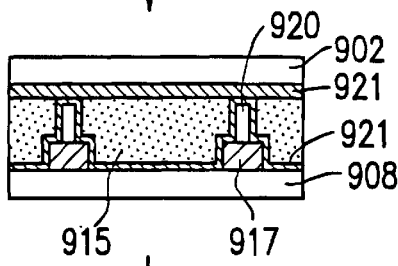
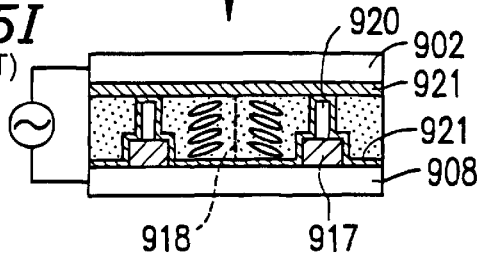

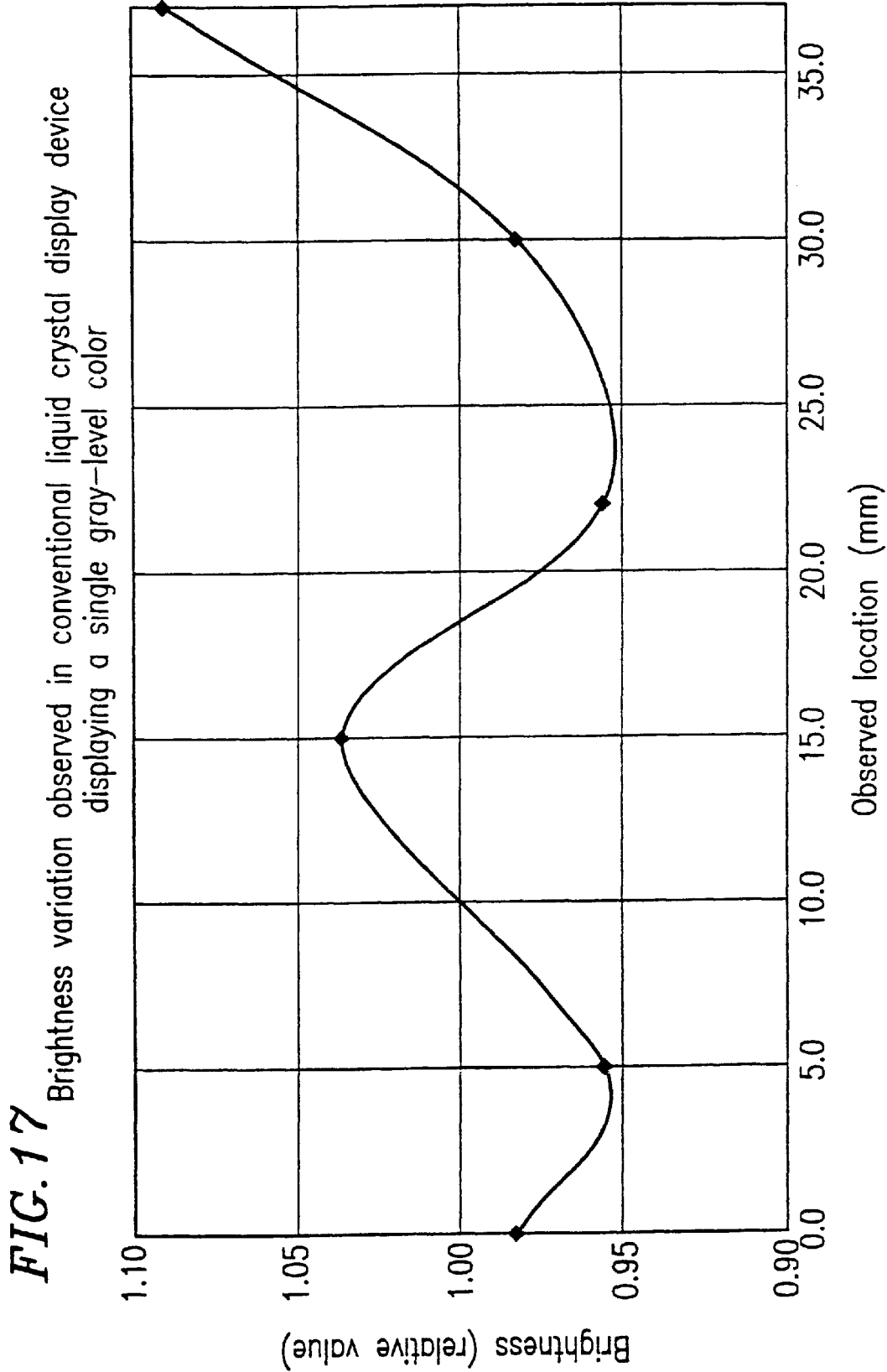
*FIG. 17* Brightness variation observed in conventional liquid crystal display device displaying a single gray-level color Cross-sectional view Plan view Cross-sectional view Plan view Appear to be black Extinction pattern

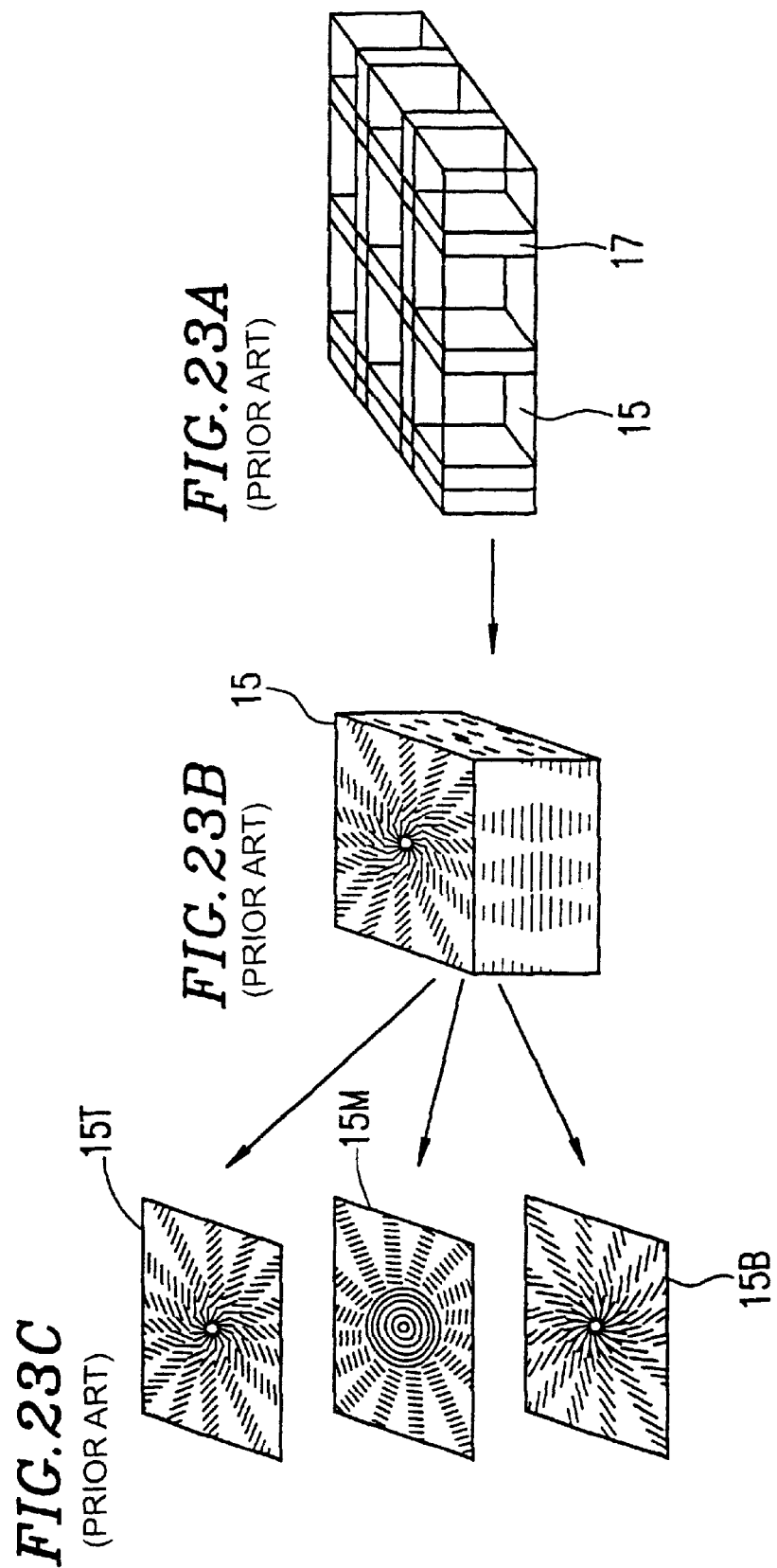

US 6,396,559 B1

LCD INCLUDING SPACERS USED IN COMBINATION WITH POLYMER WALLS

BACKGROUND OF THE INVENTION

1. Field of the Invention

The present invention relates to a liquid crystal display device for use in a personal computer, a word processor, an amusement apparatus, a television, or the like, a method for producing such a display device, and a resist for use in such a method. More particularly, the present invention relates to a liquid crystal display device in which liquid crystal molecules are oriented in axial symmetry in each of liquid crystal regions which are partitioned from one another by a polymer wall and a method for producing such a display device.

2. Description of the Related Art

Conventionally, a nematic liquid crystal display device such as a TN (twisted nematic) or STN (super twisted nematic) liquid crystal display device has been known in the art as a display device for displaying images based on an electrooptical effect. Since, this type of liquid crystal display device has a limited viewing angle, considerable effort has been put forth in the art in order to increase the viewing angle.

For example, Japanese Laid-Open Publication No. 6-301015 and Japanese Laid-Open Publication No. 7-120728 disclose a so-called "ASM (Axially Symmetrically aligned Microcell) mode TN liquid crystal display device (hereinafter "Conventional Example 1") in which liquid crystal molecules are oriented in axial symmetry in each of liquid crystal regions which are partitioned from one another by a polymer wall. Typically, each liquid crystal region substantially surrounded by the polymer wall is corresponds to one pixel.

In the ASM mode liquid crystal display device, the polymer wall substantially surrounding the liquid crystal region is provided on a side of at least one of a pair of substrates facing a liquid crystal layer. In the presence of an applied voltage, the liquid crystal molecules in each liquid crystal region are oriented in axial symmetry, thereby reducing the viewing angle dependency.

An operation principle of this liquid crystal display device will be described below with reference to FIGS. 22A to 22D. FIG. 22A is a cross-sectional view illustrating the liquid crystal display device in the absence of an applied voltage, FIG. 22B illustrates polarization microscopy (in a crossed Nicols state) of the liquid crystal display device in the absence of an applied voltage, FIG. 22C is a cross-sectional view illustrating the liquid crystal display device in the presence of an applied voltage, and FIG. 22D illustrates polarization microscopy (in a crossed Nicols state) of the liquid crystal display device in the presence of an applied voltage.

The liquid crystal display device includes a pair of substrates 14 and 18, and a liquid crystal layer 16 interposed therebetween. The liquid crystal layer 16 includes liquid crystal molecules 11 having a negative dielectric anisotropy. Transparent electrodes 19 and 10 are provided on the substrates 14 and 18, respectively, on the side facing the liquid crystal layer 16. Vertical alignment films 21 and 22 are provided on the transparent electrodes 10 and 19, respectively. A tapered polymer wall 17 is provided on the side of the substrate 18 facing the liquid crystal layer 16. A pillar-like protrusion 20 is provided selectively on the tapered polymer wall 17. The tapered polymer wall 17 substantially defines a liquid crystal region 15. As will be described later with reference to FIG. 22C, the liquid crystal molecules 11 within each liquid crystal region 15 are oriented in axial symmetry about a central axis 12.

In the absence of an applied voltage, the liquid crystal molecules 11 are aligned in a direction substantially perpendicular to the substrates 14 and 18, as illustrated in FIG. 22A, by the anchoring force of the vertical alignment films 21 and 22. When observed by a polarization microscope in a crossed Nicols state, the liquid crystal region 15 in this state exhibits a dark field (normally black mode), as illustrated in FIG. 22B.

When a voltage is applied across the liquid crystal layer 16, a force acts upon the liquid crystal molecules 11 with a negative dielectric anisotropy and orients the molecules 11 so that the long axis of the molecules 11 is perpendicular to the direction of the electric field. As a result, the molecules 11 incline from a direction substantially perpendicular to the substrate, as illustrated in FIG. 22C (gray-level display state). When observed by a polarization microscope in a crossed Nicols state, the liquid crystal region 15 in this state exhibits an extinction pattern along the polarization axis, as illustrated in FIG. 22D.

As described above, the liquid crystal display device according to Conventional Example 1 operates in a normally black mode. In the normally black mode, the liquid crystal molecules 11 are oriented in a direction perpendicular to the substrate (thereby producing a black display) in the absence of an applied voltage, whereas the liquid crystal molecules 11 are oriented in axial symmetry about the central axis 12 formed for each liquid crystal region 15 (thereby producing a white display) in the presence of an applied voltage.

The term "axially symmetrical orientation" as used herein refers to an orientation of liquid crystal molecules where the liquid crystal molecules are oriented in a spiral pattern as illustrated in FIGS. 23B and 23C, for example, but also includes other orientations such as a concentric orientation or a radial orientation. Typically, the central axis for the axially symmetrical orientation substantially coincides with the direction normal to the substrate.

FIGS. 23A to 23C are schematic diagrams of a modeled liquid crystal region 15, illustrating an orientation of the liquid crystal molecules 11 in the liquid crystal region 15. FIG. 23A illustrates a plurality of liquid crystal regions 15 defined by the polymer wall 17, FIG. 23B illustrates an orientation of the liquid crystal molecules 11 in one liquid crystal region 15, and FIG. 23C illustrates the respective orientations of the liquid crystal molecules 11 in a top layer 15T, an intermediate layer 15M and a bottom layer 15B of the liquid crystal region 15.

With such an ASM mode axially symmetrical orientation, the viewing angle characteristic of the liquid crystal display device can be improved as follows.

In the TN mode, the liquid crystal molecules in each liquid crystal region are oriented in a single direction as illustrated in FIGS. 24D to 24F. When the liquid crystal display device in a gray-level display state, as illustrated in FIG. 24E, is viewed from directions A and B, the gray-level display is properly perceived only in one of the directions A and B, but not in the other.

On the contrary, in an axially symmetrical orientation, the liquid crystal molecules are oriented in two or more orientations as illustrated in FIGS. 24A to 24C. Thus, the apparent refractive index of the liquid crystal molecules as viewed from the direction A is averaged with that from the direction B, so that the light transmission from the direction A is substantially equal to that from the direction B, thereby realizing a desirable viewing angle characteristic even in a gray-level display state as illustrated in FIG. 24B.

As described above, in an ASM mode liquid crystal display device, the liquid crystal molecules are oriented in axial symmetry, so that there is little change in the contrast even when the observer changes its viewing direction, thereby realizing a wide viewing angle characteristic.

The ASM mode liquid crystal display device according to Conventional Example 1 may be produced through a polymerization-induced phase separation of a mixture containing a polymerizable material and a liquid crystal material.

A method for producing the liquid crystal display device according to Comparative Example 1 will be described below with reference to FIGS. 15A to 15I.

First, referring to FIG. 15A, a glass substrate 908 is provided (step a). Although not shown in FIG. 15A for the sake of simplicity, a color filter and an electrode are already formed on one side of the glass substrate 908. A method for producing a color filter will be described later.

Then, referring to FIG. 15B, a polymer wall 917 is formed in a matrix pattern, for example, on the side of the glass substrate 908 on which the electrode and the color filter are formed (step b). The polymer wall 917 is provided for orienting the liquid crystal molecules in axial symmetry. More specifically, the polymer walls 917 having a matrix pattern are formed by first spin-coating a photosensitive resin material on the glass substrate,908, exposing the material via a photomask having a predetermined pattern and then developing the exposed material. The photosensitive resin material may be of either a negative or positive type. Alternatively, the polymer walls 917 may be formed by using a non-photosensitive resin material with an additional step of providing a resist film as described below.

FIG. 28 illustrates a conventional dry film resist 30. The conventional dry film resist 30 includes a base film 31 (about 75 μm thick) of polyethylene terephthalate to serve as a support. The dry film resist 30 further includes a cushion layer 32 (about 15 μm thick) of a thermoplastic resin for improving the shape conformability (an ability to closely follow any unevenness existing on the surface of the object) for the thermo-compression bonding process of the film, an oxygen blocking film 33 (about 2 μm thick) for preventing oxygen from binding to the resist thereby hampering the polymerization of the resist, a photosensitive resin layer 34 (about 2 μm thick) to serve as the resist, and a cover film 35 (about 15 μm thick) of polypropylene to serve as a resist protection film. The layers 32 to 35 are layered in this order on the base film 31.

A resist film can be provided by first peeling the cover film 35 off the dry film resist 30, pressing while heating the photosensitive resin layer 34 onto the substrate using a laminator, and then peeling and removing the base film (support) 31 off the cushion layer 32.

Then, referring to FIG. 15C, pillar-like protrusions 920 are patterned in a discrete pattern on a portion of the top surface of the polymer walls 917 (step c). The pillar-like protrusions 920 are also formed through exposure and development of a photosensitive resin material.

Then, referring to FIG. 15D, the polymer walls 917, the pillar-like protrusions 920 and the exposed surface of the glass substrate 908 are coated with a vertical alignment agent 921 of polyimide, or the like (step d).

Then, referring to FIG. 15E, a counter glass substrate 902 including an electrode (not shown) formed on one surface thereof is provided (step e).

Then, referring to FIG. 15F, the surface of the counter glass substrate 902 is coated with the vertical alignment agent 921 (step f).

Then, referring to FIG 15G, the substrates 908 and 902 are attached together so that their sides including the electrode formed thereon face each other, thereby producing a liquid crystal cell (step g). The interval between the two substrates ("the cell gap"; the thickness of the liquid crystal layer) is determined by the sum of the height of the polymer wall 917 and that of the pillar-like protrusion 920. Thus, the thickness of the liquid crystal layer (the cell gap) can be adjusted to a desired thickness.

Then, referring to FIG. 15H, a liquid crystal material is injected into the gap in the liquid crystal cell using a vacuum injection method, or the like, thereby providing a liquid crystal region 915 (step h).

Then, referring to FIG. 15I, the liquid crystal molecules within the liquid crystal region 915 are oriented in axial symmetry by, for example, applying a voltage between the pair of electrodes provided on the pair of substrates (step i). Thus, the liquid crystal molecules within the liquid crystal region 915 partitioned by the polymer wall 917 are oriented in axial symmetry about an axis 918, which is denoted in FIG. 15I by a broken line vertically extending between the substrates 902 and 908.

FIG. 16 is a cross-sectional view illustrating a conventional color filter 1000. The color filter 1000 includes a glass substrate 1001 and a black matrix (BM) 1002 formed on the glass substrate 1001 for blocking light passing through a gap between adjacent colored portions. The color filter 1000 further includes red (R), green (G) and blue (B) colored resin layers 1003. Each set of R, G and B resin layers 1003 corresponds to one pixel. An overcoat (OC) layer 1004 (about 0.5 μm to about 2.0 μm thick) of an acrylic resin or an epoxy resin is provided to cover the glass substrate 1001, the black matrix 1002 and the colored resin layers 1003. The overcoat layer 1004 is provided for (1) improving the flatness of the color filter 1000 so that an ITO film to be deposited thereon will be continuous without any disconnection and (2) protecting the colored resin surface so that the etchant used in an ITO etching process will not etch the colored resin layer. A transparent electrode 1005 of an indium tin oxide (ITO) film is further formed on the overcoat layer 1004. While the BM film 1002 is typically a metal chromium film about 100 nm to about 150 nm thick, a non-metal material is also being used recently (e.g., a photoresist type material in which carbon particles are dispersed in an acrylic photosensitive resin). A material obtained by coloring a resin with a dye or a pigment may be used for the colored resin layer 1003, and the thickness of the colored resin layer 1003 is typically about 1 μm to about 3 μm.

The color filter 1000 as described above may be produced by first forming a photosensitive colored resin layer on a substrate and then. patterning the photosensitive colored resin by photolithography. For example, an RGB color filter can be produced by forming, exposing and developing a photosensitive colored resin layer three times using red (R), green (G) and blue (B) photosensitive resin materials, respectively. For example, the photosensitive colored resin layer may be formed by applying a liquid, in which a photosensitive colored resin material is diluted with a solvent, on a substrate by a spin-coating method, or the like, or by transferring a photosensitive colored resin material prepared in the form of a dry film onto a substrate. A color liquid crystal display device having a wide viewing angle characteristic can be obtained by producing the above-described ASM mode liquid crystal display device while using the color filter as described above.

However, the ASM mode liquid crystal display device according to Conventional Example 1 and the method for producing the same have the following problems. Where the pillar-like protrusions, which define the cell gap, are formed on the polymer wall by patterning a photoresist, the larger the liquid crystal display device is, the more difficult it is to form the pillar-like protrusions with a uniform height and a uniform shape across the liquid crystal panel. Thus, the cell gap may not be uniform across the panel, thereby reducing the display quality such as the brightness uniformity and the color uniformity. FIG. 17 illustrates an exemplary brightness variation (or brightness non-uniformity) which was observed in a conventional ASM mode liquid crystal display device. As illustrated in FIG. 17, a brightness variation of about ±5% or more occurred over a few centimeters along the panel, whereby a brightness variation at a pitch of a few centimeters was perceived even by human eyes. Moreover, the need to separately provide the pillar-like protrusions increases the number of steps required for the production process.

In order to increase the definition and the brightness of an ASM mode liquid crystal display device, it is desirable to reduce as much as possible the width and the height of the polymer walls, which are provided for orienting the liquid crystal molecules in axial symmetry. To do so, however, it is necessary to increase the relative height of the pillar-like protrusions, which defines the cell gap, with respect to the height of the polymer walls, thereby increasing the influence of the thickness variation which may occur during the formation of the pillar-like protrusions. In addition, it will be difficult to form the pillar-like protrusion within the top surface of a polymer wall, and the bottom surface of the pillar-like protrusion may extend beyond the top surface of the polymer wall.

Moreover, the step of forming the pillar-like protrusions reduces the production yield of the liquid crystal display device, and the photoresist used in the step is expensive, thereby increasing the cost of producing the liquid crystal display device.

The cell gap uniformity can considerably be increased by using spacer beads for defining the cell gap instead of the pillar-like protrusions of a photosensitive resin material. In particular, the spacer beads are first mixed with a liquid resist and applied on the substrate. The mixture is then exposed and developed, so that the cell gap is defined by the spacer beads being secured in the cured resist. However, this technique has a problem which will be described below with reference to FIG. 29.

Referring to FIG. 29, some of the spacer beads 43 secured in the cured resist film 51 may be lifted by a certain distance from a substrate 1. Thus, there may be a cell gap variation which can possibly be as large as the thickness of the cured resist film 52. In order to avoid this, it is necessary to, for example, perform an additional step for pressing down the spacer beads 43 to align them at a constant level before baking the resist.

Another method commonly used in the art is to disperse spacer beads during the production process. According to the method, however, the spacer beads may contaminate a part of the production line and cause problems among other production steps, possibly reducing the production yield.

SUMMARY OF THE INVENTION

According to one aspect of this invention, a liquid crystal display device includes: a pair of substrates; a liquid crystal layer interposed between the pair of substrates; and a polymer wall formed on one of the pair of substrates. A thickness of the liquid crystal layer is defined by spacer beads to be greater than a height of the polymer wall.

In one embodiment of the invention, the spacer beads are provided on the polymer wall.

In one embodiment of the invention, a top portion of the polymer wall is a flat region.

In one embodiment of the invention, the spacer beads are colored.

In one embodiment of the invention, the polymer wall is made of a photosensitive resin.

In one embodiment of the invention, the photosensitive resin is of a negative type.

In one embodiment of the invention, the polymer wall is made of a transparent material.

In one embodiment of the invention, the spacer beads are made of a transparent material.

In one embodiment of the invention, the spacer beads are colored.

In one embodiment of the invention, the spacer beads are secured while being partially buried in the polymer wall.

In one embodiment of the invention, the polymer wall includes a portion which is acute-angle-tapered or inclined with respect to the one of the substrates.

In one embodiment of the invention, an angle of the inclined portion is about 5° to about 45° with respect to the one of the substrates.

In one embodiment of the invention, the polymer wall is made of a photosensitive resin.

In one embodiment of the invention, the photosensitive resin is of a negative type.

In one embodiment of the invention, the polymer wall is made of a transparent material.

In one embodiment of the invention, the spacer beads are made of a transparent material.

In one embodiment of the invention, the spacer beads are colored.

In one embodiment of the invention, a width of the polymer wall is equal to or greater than about twice as much as a diameter of the spacer beads.

In one embodiment of the invention, the spacer beads are made of a transparent material.

In one embodiment of the invention, the spacer beads are provided in a region where there is no polymer wall.

In one embodiment of the invention, a top portion of the polymer wall is an inclined region.

In one embodiment of the invention, an inclination angle of the inclined region is about 10° or more with respect to the substrate.

In one embodiment of the invention, the polymer wall is made of a photosensitive rein.

In one embodiment of the invention, the photosensitive resin is of a negative type.

In one embodiment of the invention, the polymer wall is made of a transparent material.

In one embodiment of the invention, the spacer beads are made of a transparent material.

In one embodiment of the invention, the spacer beads are colored.

In one embodiment of the invention, each of the spacer beads has an adhesive layer on a surface thereof.

Functions of the present invention having such a structure will be described below.

Conventionally, the pillar-like protrusions are formed on the polymer walls to define the thickness of the liquid crystal layer. According to the present invention, the thickness of the liquid crystal layer is defined by spacer beads. The spacer bead dispersion step, which is simpler and has a better production yield, can replace the conventional pillar-like protrusion formation step, which may reduce the production yield and increase the production cost. Thus, the liquid crystal display device of the present invention and the method for producing the same can improve. the production yield and reduce the production cost.

Moreover, according to the present invention, the conventional structure where the pillar-like protrusions are formed on the polymer walls to define the thickness of the liquid crystal layer is replaced with the structure employing spacer beads which have a better height uniformity. Thus, it is possible to provide a liquid crystal display device having a desirably uniform thickness across the liquid crystal layer and an improved display quality.

When the thickness of the liquid crystal layer is defined by the spacer beads placed on the polymer wall, it is possible to suppress the disturbance in the orientation of the liquid crystal molecules which may be caused by the spacer beads.

When the polymer wall includes a top portion which is a flat region, the spacer beads are more easily placed on the top of the polymer wall, whereby the thickness of the liquid crystal layer (the cell gap) can be more uniform, and it is possible to prevent the deterioration of the display quality which may occur due to a variation in the cell gap across the panel plane. In such a case, it is possible to employ a method in which the spacer beads can be dispersed across the entire surface of the substrate, thereby improving the production yield and reducing the production cost.

Alternatively, the cell gap may be defined by spacer beads which are secured while being partially buried in the polymer wall. In such a case, it is not necessary to provide the pillar-like protrusions or increase the height of the polymer wall. Therefore, it is possible to prevent the cell gap from varying due to a possible variation in the thickness of the applied photosensitive resin. Moreover, it is not necessary to increase the width of the polymer wall so that the bottom surface of the pillar-like protrusion does not extend beyond the top surface of the polymer wall, whereby it is possible to increase the definition and the brightness of the liquid crystal display device. Thus, it is possible to realize a liquid crystal display device having a desirable display quality and a wide viewing angle characteristic. Moreover, since the liquid crystal display device has a simplified structure, it is possible to inexpensively mass-produce the liquid crystal display device with a stable quality.

The spacer beads can be secured while being partially buried in the polymer wall, by first applying the spacer beads on a substrate while being mixed in a photosensitive resin material, and then patterning the applied mixture by photolithography. Thus, it is possible to place the spacer beads on the polymer walls with a high controllability. Therefore, the step of producing the pillar-like protrusions by photolithography, which is required in the conventional method, can be eliminated, thereby also eliminating the need to align the pillar-like protrusions with the polymer wall.

When the polymer wall includes a portion which is acute-angle-tapered or inclined with respect to the substrate, it is possible to suppress the disturbance in the orientation of the liquid crystal molecules located in the vicinity of the polymer wall (along the periphery of the liquid crystal region). The term "acute-angle-tapered" as used herein means that the portion is tapered so that the width at the top of the portion is smaller than the width at the bottom thereof. Thus, it is possible to prevent light leakage through the periphery of the liquid crystal region, thereby improving the contrast in a black display.

Particularly, when the inclination angle of the inclined portion is set to be about 5° to about 45°, it is possible to realize a stable axially symmetrical orientation and thus to reduce the height of the polymer wall.

When a photosensitive resin (resist) is used for the polymer wall, it is possible to substantially eliminate the need to separately form a resist film for the patterning process and thus to reduce the number of steps required for the production process.

A portion of the photosensitive resin directly under a spacer bead may not be sufficiently exposed to light. Then, if a positive photosensitive resin is used for the polymer wall, the spacer bead may remain within the pixel aperture. Therefore, a negative photosensitive resin is preferably used.

When a transparent resin is used for the polymer wall, the orientation of the liquid crystal molecules existing on the polymer wall can contribute to a display, thereby considerably improving the brightness of the display. Although the liquid crystal molecules existing on the polymer wall are not oriented in axial symmetry, such an area is small and the liquid crystal molecules existing on the polymer wall are randomly oriented, whereby those liquid crystal molecules do not adversely influence the display as a whole. Moreover, by reducing the height of the polymer wall, it is possible to suppress the amount of light attenuated through the transparent polymer wall, thereby improving the light transmission of the display device.

If the width of the polymer wall is equal to or greater than about twice as much as the diameter of a spacer bead, it is possible to reliably place the spacer bead within the width of the polymer wall.

As described above, the liquid crystal display device of the present invention includes a pair of substrates opposing each other with a liquid crystal layer therebetween, and polymer walls provided on at least one of the substrates for dividing the liquid crystal layer into a plurality of liquid crystal regions. The thickness of the liquid crystal layer is defined by the spacer beads to be greater than the height of the polymer wall. The liquid crystal molecules in each liquid crystal region are oriented in axial symmetry about an axis perpendicular to the substrate. Thus, it is possible to increase the viewing angle of a liquid crystal display device while utilizing the ASM mode liquid crystal orientation.

When the thickness of the liquid crystal layer is defined by the spacer beads existing in a region where there is no polymer wall, it is possible to maintain a constant cell gap over a large area, while preventing the cell gap from varying even when there is a variation in the height of the polymer walls. Thus, it is possible to maintain the cell gap uniform across the panel plane and to prevent the display quality from deteriorating due to a variation in the cell gap.

The top portion of the polymer wall may be an inclined region. In such a case, assembling of the liquid crystal cell can be performed after a simple dispersion of the spacer beads across the entire surface of the panel. Then, any spacer beads existing on the polymer walls will move down along the inclined surface of the polymer wall into an aperture region. Thus, in a simple and reliable manner, it is possible to ensure that the thickness of the liquid crystal layer is defined by the spacer beads which exist in a region where there is no polymer wall. Therefore, it is possible to mass-produce the liquid crystal display device having the desirable effects as described above with a stable quality. It has been experimentally confirmed that the above-described effects are provided when the inclination angle of the inclination region is about 10° or more with respect to the substrate.

It has also been experimentally confirmed that by the use of colored spacer beads (e.g., black) instead of using the transparent spacer beads, it is possible to suppress the disturbance in the axially symmetrical orientation due to the presence of the spacer beads within the liquid crystal region, and to prevent the display quality from deteriorating due to possible leakage of light passing through the spacer beads aggregated within the liquid crystal region.

The relationship between the display quality and the spacer bead dispersion density was studied for a liquid crystal display device using colored spacer beads. The spacer bead dispersion density was defined by the number of groups of spacer beads (each group including a few spacer beads which are aggregated together) in a given size of liquid crystal region. It was found that where colored spacer beads are used, the display quality does not substantially deteriorate even when the spacer bead dispersion density is as high as, for example, about 8–10 groups per liquid crystal region (having a size of about 100 $\mu$m×100 $\mu$m). Thus, with colored spacer beads, it is possible to increase the spacer bead dispersion density by about 2-fold to about 2.5-fold from that when transparent spacer beads are used, without substantially deteriorating the display quality. Thus, it is possible to considerably increase the process margin.

The above-described liquid crystal display device may be produced by a method including the steps of: coating a photosensitive material on a substrate: dispersing spacer beads on the substrate having the photosensitive material being applied thereon: and forming polymer walls by patterning through photolithography the photosensitive material on the substrate having the spacer beads being dispersed therein. Then, it is possible to provide the spacer beads selectively on the polymer walls. Thus, it is possible to prevent the disturbance in the orientation of the liquid crystal molecules which may be caused by the presence of the spacer beads within the pixel aperture, thereby further improving the display quality.

Alternatively, a spacer bead dispersion process and a heat treatment may be performed after exposing the polymer wall pattern (provided for orienting the liquid crystal molecules in axial symmetry), followed by a development process. In this way, it is possible to realize a structure where the spacer beads exist only on the polymer walls. Therefore, it is possible to reduce the contamination of the production line due to the spacer beads, thereby further improving the production yield.

The post-exposure heat treatment not only adjusts the sensitivity (resolution) of the photosensitive material for the polymer wall but also secures the spacer beads. Thus, no additional step is required.

Moreover, when the surface of the spacer beads is coated by an adhesive material which is suitable for the conditions under which the post-exposure baking process for the photosensitive material is performed, it is possible to more reliably secure the spacer beads on the polymer walls. Thus, it is possible to produce a high-quality liquid crystal display device with an even higher production yield while preventing the production yield or the display quality from deteriorating.

According to the described above production, a liquid crystal display device is produced by first coating a photosensitive transparent acrylic resin (the material for the polymer wall) on a substrate, dispersing the spacer beads for defining the cell gap, and then exposing and developing the applied resin using a mask having a predetermined polymer wall pattern, so as to leave the spacer beads selectively on the patterned polymer walls. In such a case, it is preferred to disperse the spacer beads prior to pre-baking the photosensitive resin so that the spacer beads are more likely to be secured on the surface of the resist. However, performing the spacer bead dispersion process before the pre-bake process means that the spacer bead dispersion process is performed between the coating process and the heat treatment. Then, the resist is in a half-dried state for a long period of time, whereby a foreign substance is more likely to attach to the resist, reducing the production yield. Moreover, since the substrate is carried into an exposure apparatus with the spacer beads being dispersed on the substrate, the exposure apparatus may be contaminated by the spacer beads. Particularly, in the production of a large liquid crystal display device for which a proximity exposure method (where the substrate and the photomask are brought into a close proximity to each other) is often used, the contamination of the photomask by the spacer beads may present a more serious problem.

In view of this, it is alternatively possible to disperse the spacer beads after applying and exposing the photosensitive material in the same manner as in the prior art. In this way, it is possible to prevent the spacer beads from contaminating the exposure apparatus or the production line used between the application step and the exposure step, and thus to prevent the production yield from lowering.

Alternatively, the development process may be performed after the spacer beads are fused onto the photosensitive material by using a PEB (post-exposure baking) step for-adjusting the sensitivity (resolution) of the photosensitive material. In this way, no additional step needs to be provided.

The spacer beads are more reliably secured on the polymer walls if an adhesive material, which melts at a temperature lower than the heat treatment temperature, is applied on the surface of, the spacer beads before the heat treatment.

Thus, the invention described herein makes possible the advantages of: (1) providing a liquid crystal display device having a simplified structure, a uniform cell gap, a good display quality and a wide viewing angle characteristic which can be produced with a reduced number of production steps and with a stable quality, and which can be mass-produced inexpensively; and (2) providing a method for producing such a liquid crystal display device.

These and other advantages of the present invention will become apparent to those skilled in the art upon reading and understanding the following detailed description with reference to the accompanying figures.

BRIEF DESCRIPTION OF THE DRAWINGS

The file of this patent contain one (1) drawing executed in color copies of this patent with color drawings will be provided by the U.S. Patent & Trademark Office upon request and payment of the necessary fee.

FIGS. 15A to 15I illustrate a method for producing a conventional liquid crystal display device;

FIG. 17 is a graph illustrating a brightness variation as measured for a conventional liquid crystal display device;

FIGS. 23A to 23C are schematic diagrams of a liquid crystal region of an ASM mode liquid crystal display device, illustrating an orientation of liquid crystal molecules in the liquid crystal region;

DESCRIPTION OF THE PREFERRED EMBODIMENTS

Figure 1:
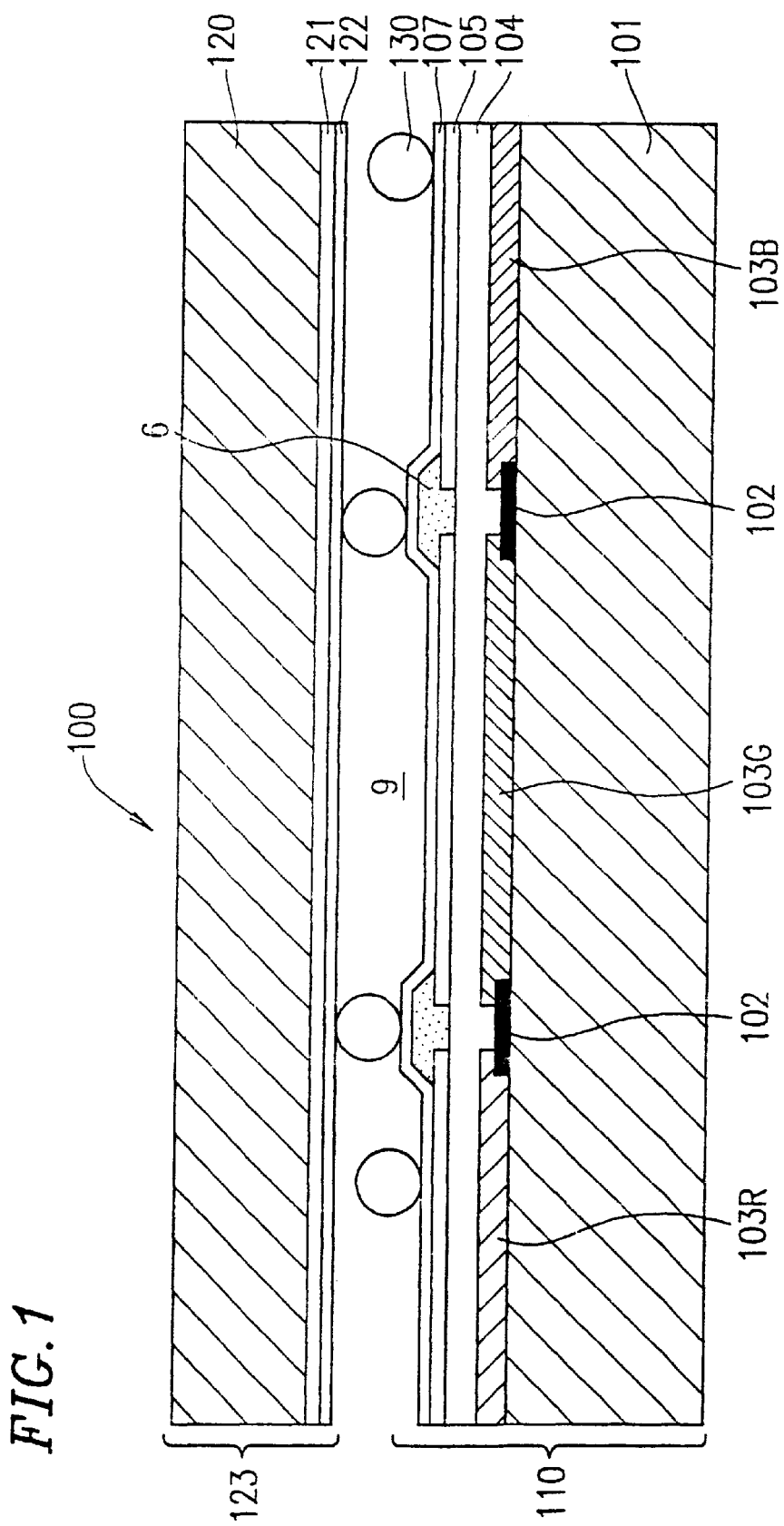
FIG. 1 is a schematic diagram illustrating a cross section of a liquid crystal display device according to Example 2 of the present invention.

According to the present invention, a liquid crystal display device includes a pair of substrates opposing each other with a liquid crystal layer therebetween, and polymer walls provided on at least one of the substrates for dividing the liquid crystal layer into a plurality of liquid crystal regions. The operation principle of the liquid crystal display device is substantially the same as that of a conventional ASM mode liquid crystal display device where the liquid crystal molecules are oriented in axial symmetry. In the absence of an applied voltage, the liquid crystal molecules are oriented in a direction substantially perpendicular to the substrate. In the presence of an applied voltage, the liquid crystal molecules in each liquid crystal region are oriented in axial symmetry about a central axis. Thus, such a liquid crystal display device has an improved viewing angle characteristic, whereby the contrast does not substantially vary irrespective of the direction in which the observer observes the liquid crystal display device.

In the liquid crystal display device of the present invention, the cell gap is defined by the spacer beads. The cell gap uniformity and thus the display quality of the liquid crystal display device are considerably improved from those in a conventional liquid crystal display device.

Especially when producing a large liquid crystal display-device, it is very difficult to form the pillar-like protrusions (which define the thickness of the liquid crystal layer as described above) with a uniform height across the substrate. This is because (1) it is difficult to coat a pillar-like protrusion material without causing a height variation across a substrate having a large area (e.g., 1 m$^2$), and (2) the resultant pillar-like protrusions formed on the substrate will have a substantial height variation across the substrate area as a result of the subsequent exposure, development and baking steps, each of which introduces some variation across the substrate area.

Our researches have confirmed that the height variation among the produced pillar-like protrusions is periodic and continuous across the substrate since it basically reflects the tendency in the original height variation produced while coating the pillar-like protrusion material on the substrate. Accordingly, in use, the produced liquid crystal display device has a brightness variation and/or a color variation across the display area-due to the periodic and continuous height variation among the pillar-like protrusions, thereby reducing the display quality thereof.

Thus, where the cell gap is defined by the pillar-like protrusions, the brightness and/or color variation occurs due to the continuous change in the height of the pillar-like protrusion. Such a variation is inevitable as long as the pillar-like protrusions are formed by coating a material on the substrate and then processing the material. It does not matter whether the pillar-like protrusion material is a liquid resist or a dry film resist because the resist surface will have continuous variation in either case.

On the contrary, where the cell gap is defined by spacer beads as in the present invention, such a brightness/color variation can be suppressed as will be described below. Normally, any spacer beads to be dispersed across the liquid crystal panel have a diameter variation which is comparable to the pillar-like protrusion height variation. However, the spacer beads are dispersed in a totally random manner, whereby the diameter variation among the dispersed spacer beads will not be periodic or continuous (spacer beads cannot be dispersed in such a manner that their diameters vary continuously). As a result, the diameter variation among the spacer beads will not result in a brightness/color variation which can be visually perceived. Thus, according to the present invention, it is possible to provide a liquid crystal display device with a desirable display uniformity.

Now, various examples of the present invention will be described with reference to the accompanying drawings.

EXAMPLE 1

Figure 18A:
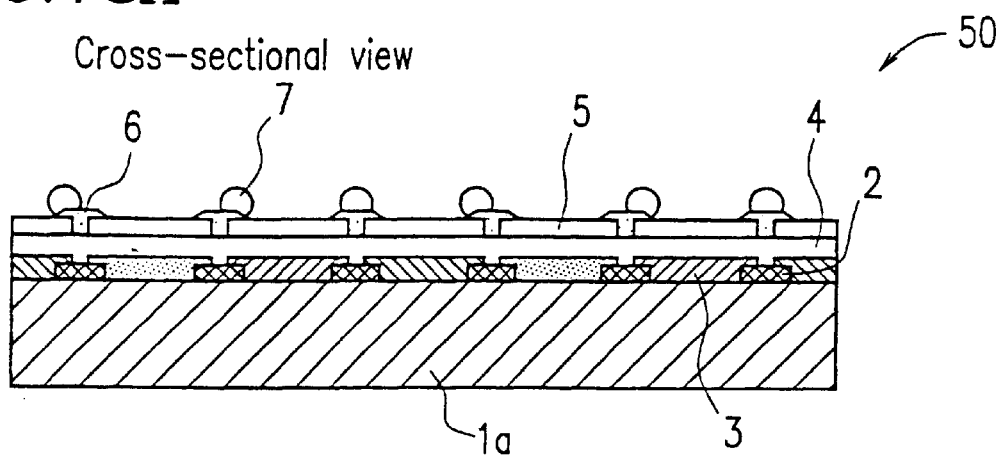
FIGS. 18A and 18B are a schematic cross-sectional view and a schematic plan view, respectively, illustrating one of a pair of substrates used in a liquid crystal display device according to Example 1 of the present invention.
Figure 18B:
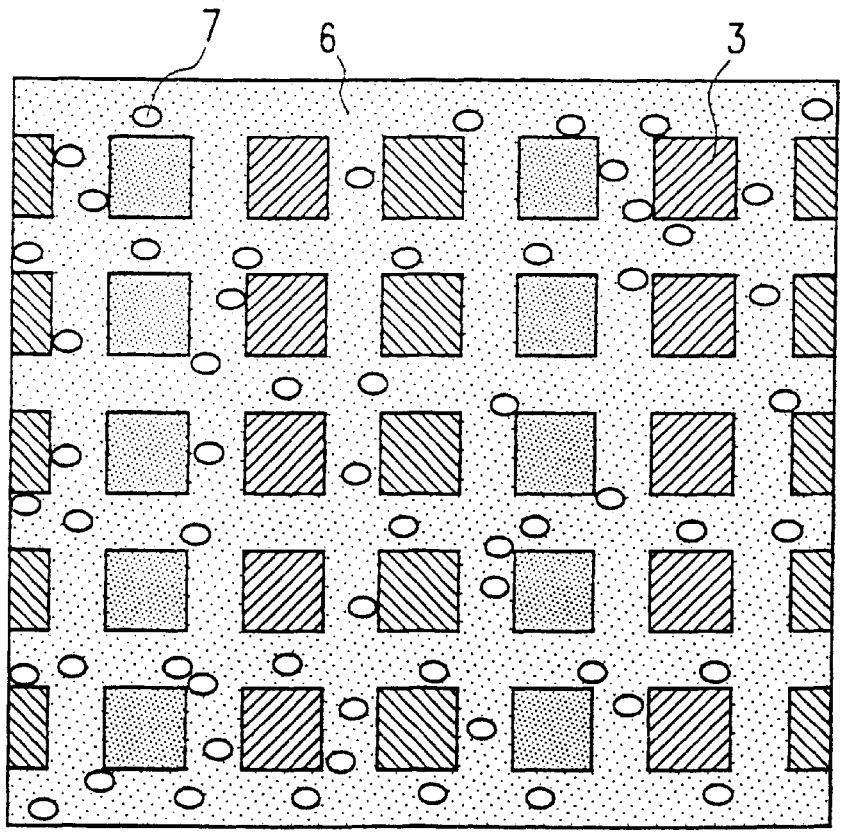

FIG. 18A is a cross-sectional view schematically illustrating a structure of one of a pair of substrates provided in a liquid crystal display device 50 according to Example 1 of the present invention with a liquid crystal layer being interposed therebetween, and FIG. 18B is a plan view thereof.

Referring to FIGS. 18A and 18B, a glass substrate 1a includes a color filter provided thereon. The color filter includes a plurality of sets of red (R), green (G) and blue (B) colored resin layers 3 (each set corresponding to one pixel) and a BM (black matrix) layer 2 for blocking light passing through a gap between adjacent colored portions. An overcoat layer 4 is provided to fill the gap between adjacent colored portions existing directly above the BM layer 2 and to protect the surface of the color filter. A transparent electrode 5 of ITO is provided on the overcoat layer 4 as a signal electrode.

A plurality of polymer walls 6 are provided over the transparent electrode 5 so as to surround respective pixels, and spacer beads 7, which define the cell gap, are secured while being partially buried in the polymer walls 6.

Figure 19A:
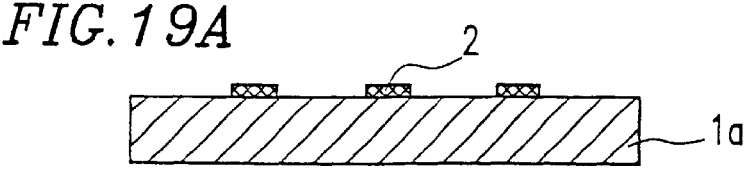
FIGS. 19A to 19B illustrate a method for producing the liquid crystal display device according to Example 1 of the present invention.
Figure 19B:
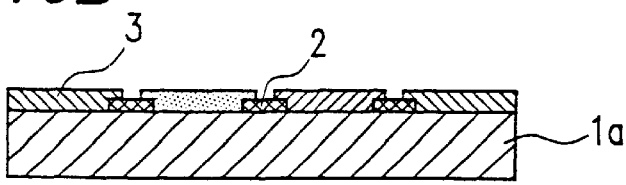
Figure 19C:
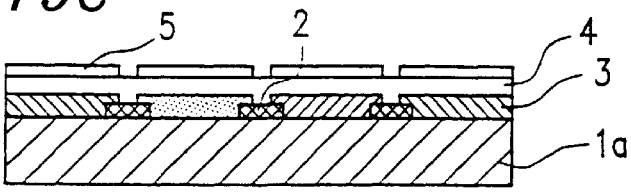
Figure 19D:
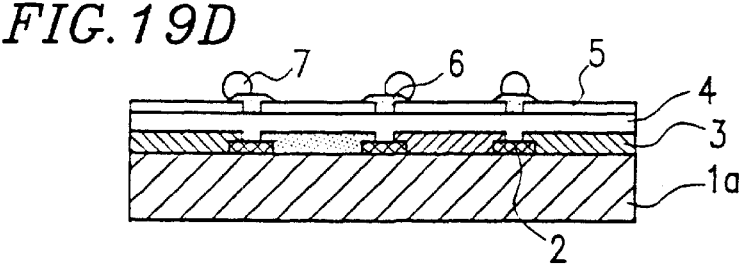
Figure 19E:
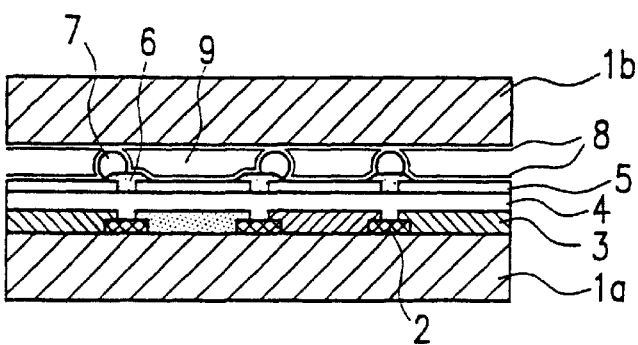

Referring to FIG. 19E, a vertical alignment film 8 is provided over the entire area of the substrate 1a, and the substrate 1a is attached to a counter substrate 1b which also includes the vertical alignment film 8 and an ITO electrode (not shown) formed thereon. The substrates 1a and 1b interpose a liquid crystal layer of a liquid crystal material having a negative dielectric anisotropy. Each liquid crystal region 9 is surrounded by the polymer wall 6.

The liquid crystal display device 50 can be produced as follows, for example.

First, referring to FIG. 19A, the BM layer 2 is formed on the glass substrate 1a for blocking light passing through the gap between adjacent ones of the R, G and B colored portions. The BM layer 2 may be formed of a material obtained by dispersing carbon particles in an acrylic photosensitive resin.

Then, referring to FIG. 19B, R, G and B colored resin layers 3 are successively formed. According to Example 1, the BM layer 2 and each of the colored resin layers 3 are both about 1.0 μm thick, and are formed by first spin-coating a material on a substrate and then patterning the applied material by photolithography into a predetermined pattern.

Then, referring to FIG. 19C, the overcoat layer 4 is formed over the BM layer 2 and the colored resin layers 3, and the transparent electrode 5 of ITO is formed on the overcoat layer 4. According to Example 1, the overcoat layer 4 is formed by spin-coating an overcoat material to be about 1.0 μm thick, and the transparent electrode 5 is formed by sputtering an ITO film to be about 300 nm thick and then patterning the sputtered ITO film into a predetermined pattern.

Then, referring to FIG. 19D, the polymer walls 6 (for orienting the liquid crystal molecules in axial symmetry) are formed, and the spacer beads 7, which define the cell gap, are secured while being partially buried in the polymer walls 6. A negative photosensitive resin (e.g., "CSP-S002" manufactured by FUJIFILM OLIN CO., LTD.) may be used for the polymer walls 6. Transparent plastic spacer beads having a diameter of about 5.5 μm may be mixed in the resin and the resin applied on the substrate to be about 1.0 μm thick. Then, a proximity exposure process using ultraviolet rays is performed under a predetermined condition such that the polymer wall material existing directly under a spacer bead is sufficiently photo-polymerized by the ultraviolet rays, so as to pattern the applied resin with the size of each liquid crystal region being about 150 μm×150 μm. If a positive resist is used for the polymer wall 6, a portion of the resist directly under a spacer bead may not be sufficiently exposed to light. As a result, some spacer beads may remain in a region (the pixel aperture) where the spacer beads should not remain. Thus, it is preferred to use a negative resist. The polymer wall 6 is preferably formed so that the width thereof is about 15 μm and the cross-sectional taper angle thereof is controlled to be about 5° to about 45° by adjusting the "proxy gap" (or the gap between the mask and the substrate during the proximity exposure process). When the taper angle is less than about 5°, a sufficient anchoring force for orienting the liquid crystal molecules in axial symmetry might not be obtained. When the taper angle is more than about 45°, the disturbance in the orientation of the liquid crystal molecules may become conspicuous, thereby considerably reducing the contrast in a black display due to possible light leakage. According to Example 1, the taper angle is about 30°. Then, a development process is performed by using a developing solution (e.g., "CD" manufactured by FUJIFILM OLIN CO., LTD.), and the produced substrate is rinsed by a high-pressure pure water spray, so as to leave the spacer beads 7 only on the polymer walls 6. Thereafter, a post-bake process is performed at about 240° C. for about 60 minutes so as to secure the spacer beads 7 as partially buried in the polymer walls 6. Thus, a cell gap of about 5.5 μm can be obtained.

Then, referring to FIG. 19B, after the vertical alignment film 8 is formed over the substrates 1a and 1b, the substrates 1a and 1b are attached to each other and a liquid crystal material is injected into the gap therebetween, thereby producing the liquid crystal regions 9. According to Example 1, the vertical alignment film 8 may be formed by spin-coating an appropriate material (e.g., "JALS-204" manufactured by Japan Synthetic Rubber Ltd.). The substrates 1a and 1b may be attached to each other, and an n-type liquid crystal material ($\Delta\epsilon=-4.0$, $\Delta n=0.08$, with a twist angle inherent to the liquid crystal material adjusted to 90° twist within a cell gap of about 6 μm) may be injected into the gap therebetween, thereby producing a liquid crystal cell.

A voltage of about 4 V is applied across the cell, in order to define an orientation axis of the liquid crystal molecules within the produced display cell. Immediately after the voltage application, a plurality of orientation axes are initially formed. After a continued voltage application, there will be only one orientation axis in each liquid crystal region 9 which then has only one axially symmetric orientation region ("monodomain").

Polarizers are provided on the respective sides of the liquid crystal cell in a crossed Nicols state, thereby producing the liquid crystal display device 50.

The liquid crystal region 9 of an actually produced liquid crystal display device in a transmission mode was observed with a polarization microscope (in a crossed Nicols state) in the absence of an applied voltage. The results are illustrated in a schematic diagram of FIG. 10. The liquid crystal region 9 in the absence of an applied voltage exhibits a dark field since the display device operates in the normally black mode. (In FIG. 10, the polymer wall 6 and the liquid crystal region 9 are distinguished from each other by being hatched in different manners for illustrative purposes, whereby each boundary between the polymer wall 6 and the liquid crystal region 9 is distinctive. In practice, however, the boundary between the polymer wall 6 and the liquid crystal region 9 is generally not distinctive when viewed with a polarization microscope in a crossed Nicols state.)

Figure 10:
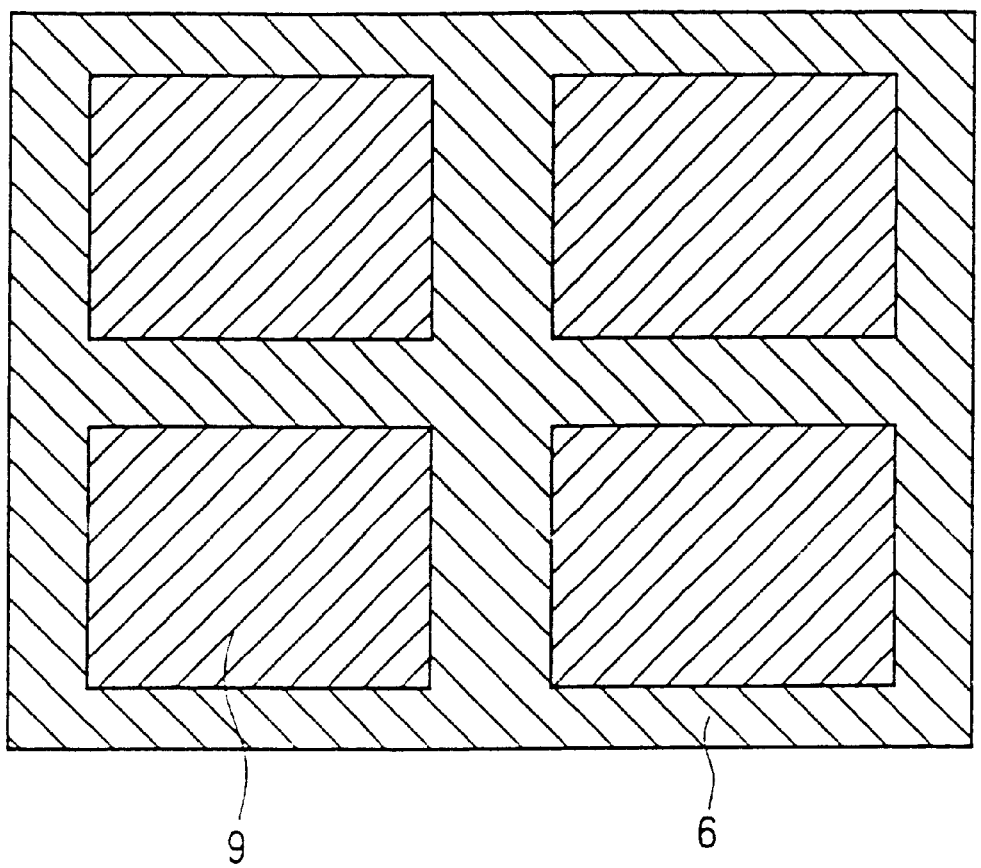
FIG. 10 is a schematic diagram illustrating polarization microscopy of four pixels (liquid crystal regions) of the liquid crystal display device according to Example 2 of the present invention.

As can be seen in FIG. 10, there was no substantial light leakage in a black display across the display cell, thereby obtaining a high contrast ratio.

Thus, Example 1 of the present invention eliminates the need to provide pillar-like protrusions, which are provided by photolithography in a conventional ASM mode liquid crystal display device where the liquid crystal molecules are oriented in axial symmetry. Therefore, the variation in the cell gap can be reduced from that of a conventional liquid crystal display device, thereby considerably improving the display quality. Moreover, since no pillar-like protrusion is provided on the polymer walls (which are provided for orienting the liquid crystal molecules in axial symmetry), it is possible to reduce the width of the polymer wall from that of a conventional liquid crystal display device, thereby increasing the light transmission and the brightness of the display.

Example 1 of the present invention also eliminates the pillar-like protrusion formation step which is required for producing a conventional ASM mode liquid crystal display device, thereby reducing the cost and improving the production yield.

EXAMPLE 2

FIG. 1 is a schematic diagram illustrating a cross section of a liquid crystal display device 100 according to Example 2 of the present invention.

Referring to FIG. 1, the liquid crystal display device 100 includes a glass substrate 101, and a black matrix (BM) 102 and R, G and B colored resin layers 103R, 103G and 103B formed on the glass substrate 101. The liquid crystal display device 100 further includes an overcoat layer 104 for protecting and flattening the surface of the black matrix (BM) 102 and the colored resin layers 103R, 103G and 103B. A transparent electrode 105 of ITO and polymer walls 6 (which are provided for orienting the liquid crystal molecules in axial symmetry) are provided on the overcoat layer 104. The polymer wall 6 has a height of about 1.0 μm, a bottom width of about 30 μm and a top width of about 20 μm at the flat top surface thereof. Each liquid crystal region 9 has a size of about 100 μm×100 μm. The liquid crystal molecules in each liquid crystal region 9 are subject to the anchoring force of the polymer wall 6 substantially surrounding the liquid crystal region 9, whereby the liquid crystal molecules are oriented in axial symmetry. The surface of the transparent electrode 105 and the surface of the polymer wall 6 are covered with a vertical alignment film 107, and the surface of a counter electrode 121 of ITO on the surface of a counter substrate 123 is covered with a vertical alignment film 122. The gap (the cell gap) between a color filter substrate 110 and the counter substrate 123 is defined by spacer beads 130 having a diameter of about 5.0 μm which exist on top of the polymer wall 6. Although some of the spacer beads 130 may exist also in the liquid crystal region 9, it has been experimentally confirmed that such spacer beads 130 will not disturb the orientation of the liquid crystal molecules when the average number of groups of spacer beads 130 within an area of about 100 μm×100 μm is about 4 or less.

Next, a method for producing the liquid crystal display device 100 will be described with reference to FIGS. 2A to 2F.

Figure 2A:
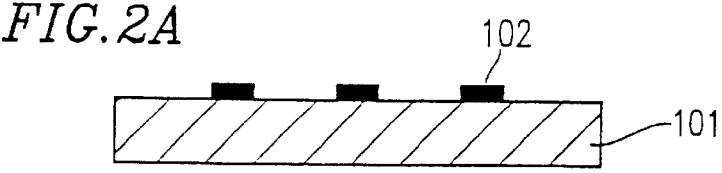
FIGS. 2A to 2F illustrate a method for producing the liquid crystal display device according to Example 2 of the present invention.

First, referring to FIG. 2A, the black matrix (BM) 102 is formed on the glass substrate 101 for blocking light passing through a gap between adjacent ones of the R, G and B colored portions (step 2a). A material for the BM 102 may be obtained by dispersing carbon particles in an acrylic photosensitive resin.

Figure 2B:
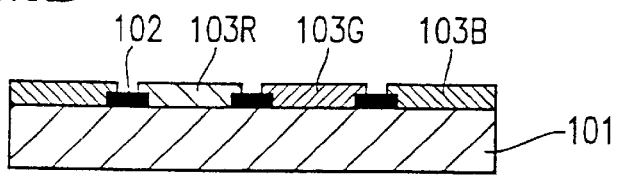

Then, referring to FIG. 2B, the R, G and B colored resin layers 103R, 103G and 103B are successively formed on the glass substrate 101 having the BM 102 formed thereon (step 2b). The BM layer 102 and each of the colored resin layers 103R, 103G and 103B may both be about 1.0 μm thick, and formed by first spin-coating a material on the substrate 101 and then patterning the applied material by photolithography into a predetermined pattern.

Figure 2C:
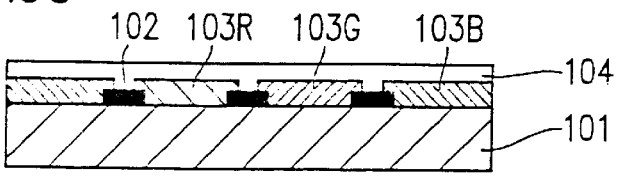

Then, referring to FIG. 2C, the overcoat layer 104 is spin-coated to be about 2.0 μm thick for protecting and flattening the surface of the black matrix (BM) 102 and the colored resin layers 103R, 103G and 103B (step 2c).

Figure 2D:
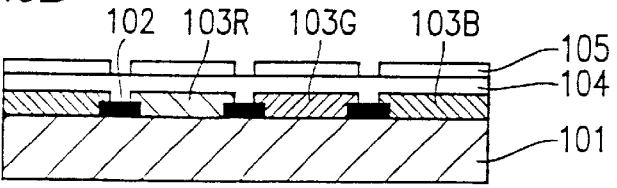

Then, referring to FIG. 2D, an ITO film is deposited on the overcoat layer 104 by sputtering to be about 300 nm thick, and the ITO film is patterned by photolithography and wet-etched with an aqua regia type etchant, thereby forming the transparent electrode 105 (step 2d).

Figure 2E:
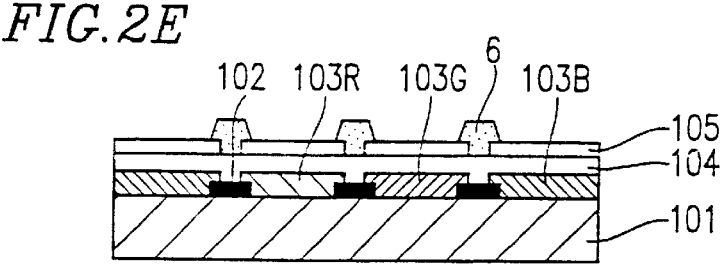

Then, referring to FIG. 2E, a photosensitive acrylic resin is spin-coated on the substrate to be about 1.0 μm thick, and patterned by photolithography with a mask having a predetermined pattern so as to form the polymer walls 6 (step 2e). When a proximity exposure machine with UV light source (having a proxy gap of about 50 μm) is used to expose a polymer wall pattern, the polymer walls 6 are formed with a bottom width of about 30 μm and a top width of about 20

μm. According to Example 2, each liquid crystal region defined by the polymer wall 6 has a size of about 100 μm×100 μm.

Figure 2F:
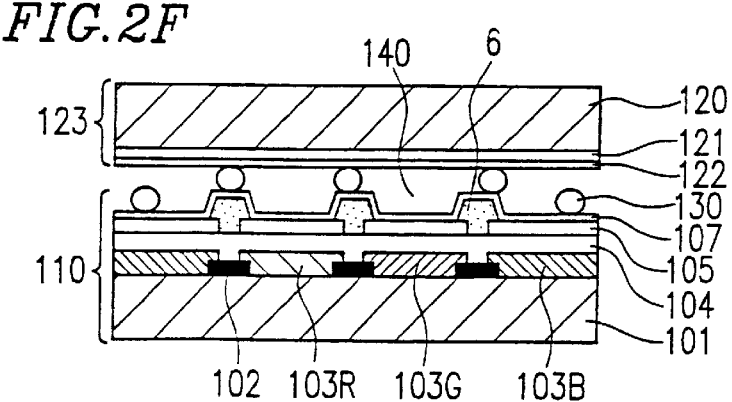

Then, an alignment film material (e.g., JALS-204" manufactured by Japan Synthetic Rubber Ltd.) is spin-coated across the entire surface of the substrate as illustrated in FIG. 2E, so as to form the vertical alignment film 107, thereby producing the color filter substrate 110 as illustrated in FIG. 2F.

Then, the color filter substrate 110 is attached to the counter substrate 123 (which includes a glass substrate 120, the counter electrode 121 of ITO formed on the glass substrate 120, and the vertical alignment film 122 formed on the counter electrode 121) with spherical spacer beads 130 made of resin (having a diameter of about 5.0 μm) interposed therebetween. The spacer beads 130 are dispersed by a dry method to a dispersion density of about 4 groups/0.01 μm² or less. The spacer beads 130 are uniformly dispersed on top of the polymer walls 6 and also in the liquid crystal regions 9. A liquid crystal material having a negative dielectric anisotropy is injected into a gap between the substrates 110 and 123 to provide a liquid crystal layer 140 between the substrates 110 and 123, thereby producing a liquid crystal cell (step 2f). For example, the liquid crystal material maybe an n-type liquid crystal material ($\Delta\varepsilon=-4.0$, $\Delta n=0.08$, with an addition of a chiral agent for adjusting a twist angle to 90° within a cell gap of about 6.0 μm).

A voltage of about 4 V is applied across the cell, in order to stabilize the central axis about which the liquid crystal molecules are oriented in axial symmetry. Immediately after the voltage application, a plurality of orientation axes are initially formed. After a continued voltage application, there will be only one orientation axis in each liquid crystal region 9 which then has only one axially symmetric orientation region ("monodomain"). Polarizers are provided on the respective sides of the liquid crystal cell in a crossed Nicols state, thereby producing the liquid crystal display device 100.

The liquid crystal region 9 of an actually produced liquid crystal display device in a transmission mode was observed with a polarization microscope in the absence of an applied voltage. The results are illustrated in a schematic diagram of FIG. 10. The liquid crystal region 9 in the absence of an applied voltage exhibits a dark field, which means that the display device operates in the normally black mode. (In FIG. 10, the polymer wall 6 and the liquid crystal region 9 are distinguished from each other by being hatched in different manners for illustrative purposes, whereby each boundary between the polymer wall 6 and the liquid crystal region 9 is distinctive. In practice, however, the boundary between the polymer wall 6 and the liquid crystal region 9 is generally not distinctive when viewed with a polarization microscope in a crossed Nicols state.)

Figure 11:
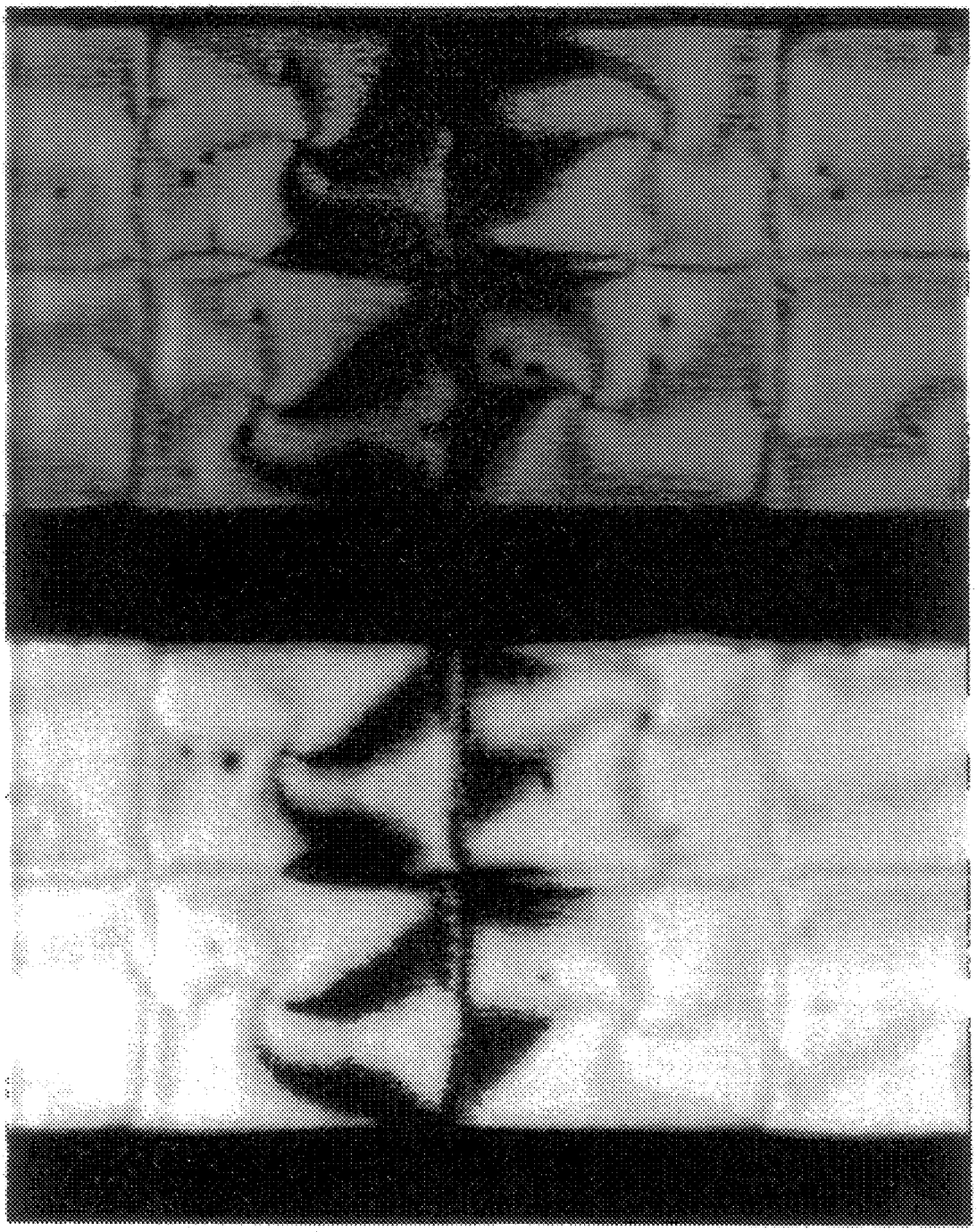
FIG. 11 is a photograph illustrating a plurality of liquid crystal regions surrounded by polymer walls exhibiting an axially symmetrical orientation formed on the blue and green colored resin layers in the presence of an applied voltage in the liquid crystal display device according to Example 2 of the present invention.

As can be seen in FIG. 10, there was no substantial light leakage in a black display across the display cell. In the presence of an applied voltage, no disturbance in the axially symmetrical orientation of the liquid crystal molecules is observed, which may be caused by the spacer beads existing in the liquid crystal region 9. FIG. 11 is a photograph illustrating a plurality of liquid crystal regions surrounded by polymer walls exhibiting an axially symmetrical orientation formed on the blue and green colored resin layers in the presence of an applied voltage. In FIG. 11, the spacer beads appear as black spots. However, no disturbance in the axially symmetrical orientation is observed in FIG. 11.

Figure 12:
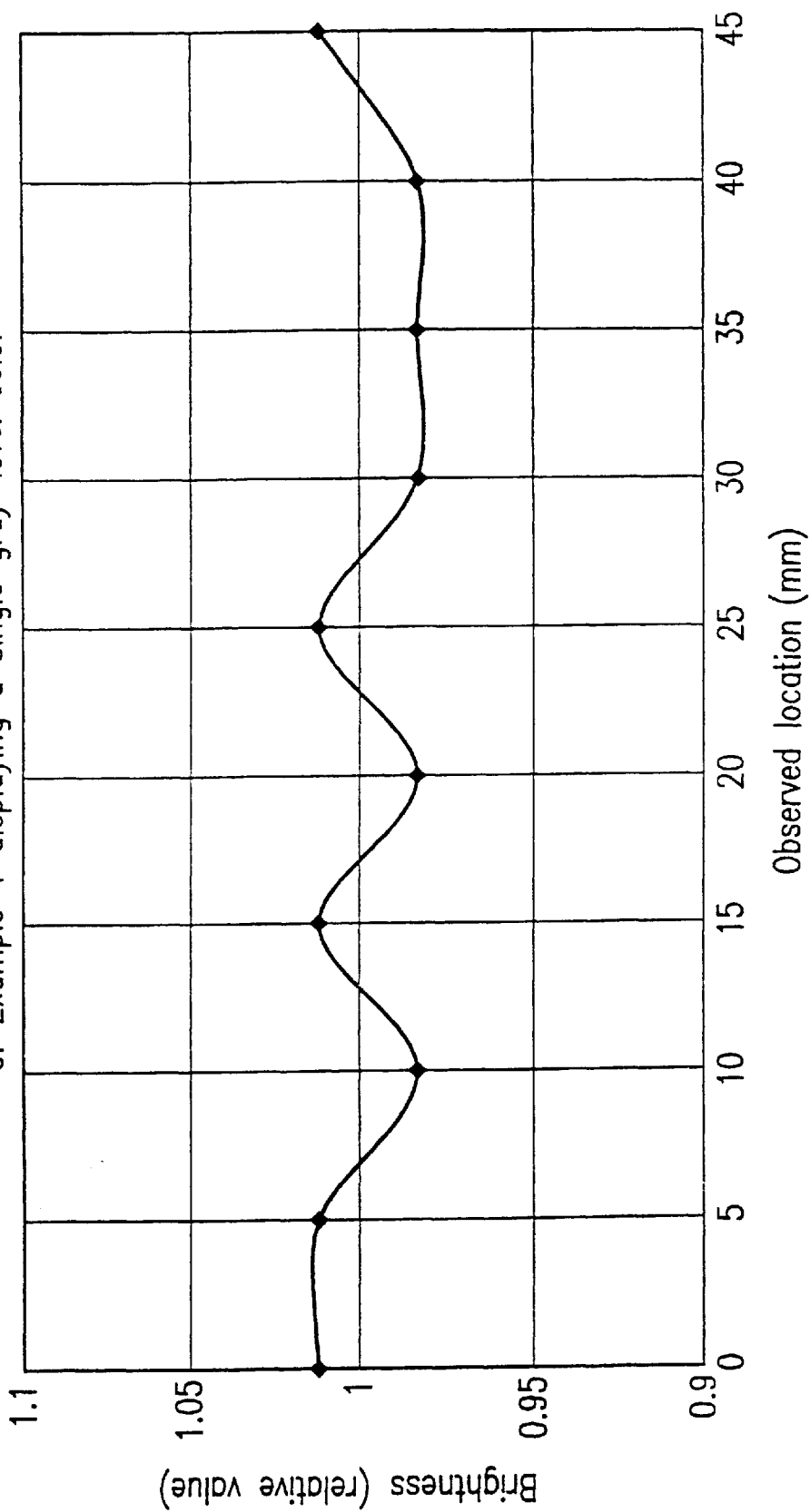
FIG. 12 is a graph illustrating a brightness variation as measured for the liquid crystal display device according to Example 2 of the present invention.

FIG. 12 illustrates a brightness distribution measured with the liquid crystal display device 100 according to Example 2, in a gray-level display state. For comparison, FIG. 17 illustrates a brightness distribution measured with a conventional liquid crystal display device having pillar-like protrusions on the polymer walls 6, in a gray-level display state.

As can be seen from FIG. 17, the conventional liquid crystal display device has a brightness variation of about ±5% or more occurring over a few centimeters along the panel, whereby a brightness variation at a pitch of a few centimeters can be perceived even by human eyes. On the contrary, the brightness variation of the liquid crystal display device 100 of Example 2 is reduced to about ±2% or less (a level which cannot be perceived by human eyes). Thus, according to Example 2, it is possible to obtain a liquid crystal display device having a further improved display quality.

EXAMPLE 3

Figure 9:
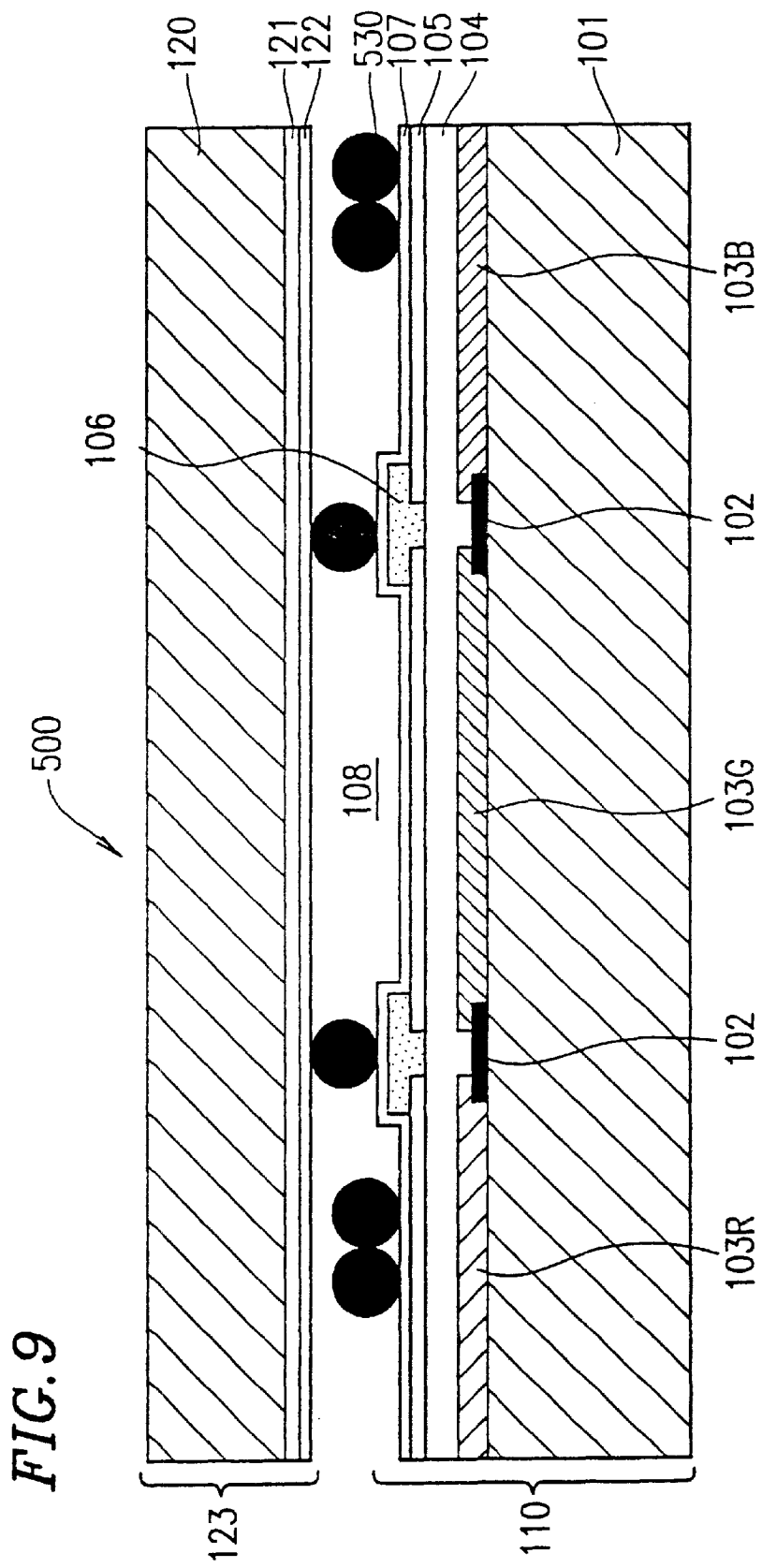
FIG. 9 is a schematic diagram illustrating a cross section of a liquid crystal display device according to Example 3 of the present invention.

FIG. 9 is a schematic diagram illustrating a cross section of a liquid crystal display device 500 according to Example 3 of the present invention.

As illustrated in FIG. 9, Example 3 differs from Example 2 described above in that Example 3 employs colored spacerbeads 530 (e.g., black). Other than this, Example 3 is substantially the same as Example 2. Accordingly, the liquid crystal display device 500 of Example 3 can be produced by substantially the same method as that described above in Example 2 with reference to FIGS. 2A to 2F.

It has been experimentally confirmed that the deterioration in the display quality caused by the spacer beads can be attributed to the disturbance in the axially symmetrical orientation due to the presence of the spacer beads in the liquid crystal region and to the light leakage due to the aggregation of the spacer beads in the liquid crystal region.

Regarding the disturbance in the axially symmetrical orientation, the deterioration of the display quality can be prevented by setting the dispersion density of transparent spacer beads to, for example, about 10 groups/liquid crystal region (about 100 μm×100 μm) or less.

Regarding the light leakage, even when the transparent spacer bead dispersion density is set to be lower than the above value (about 10 groups/liquid crystal region), a few spacer beads may still aggregate in a liquid crystal region, whereby light may leak through the aggregated beads. Then, the contrast of the display may be reduced, and some roughness (display non-uniformity) may be observed.

It has been experimentally confirmed that the light leakage may be considerably reduced by using colored spacer beads (e.g., black) instead of transparent spacer beads.

It has been experimentally confirmed that where colored spacer beads are used, the display quality does not substantially deteriorate even when the spacer bead dispersion density is as high as, for example, about 8–10 groups per liquid crystal region (about 100 μm×100 μm).

Thus, with colored spacer beads, it is possible to increase the spacer bead dispersion density by about 2-fold to about 2.5-fold from that when transparent spacer beads are used, without substantially deteriorating the display quality. Thus, it is possible to considerably increase the process margin.

EXAMPLE 4

Figure 3:
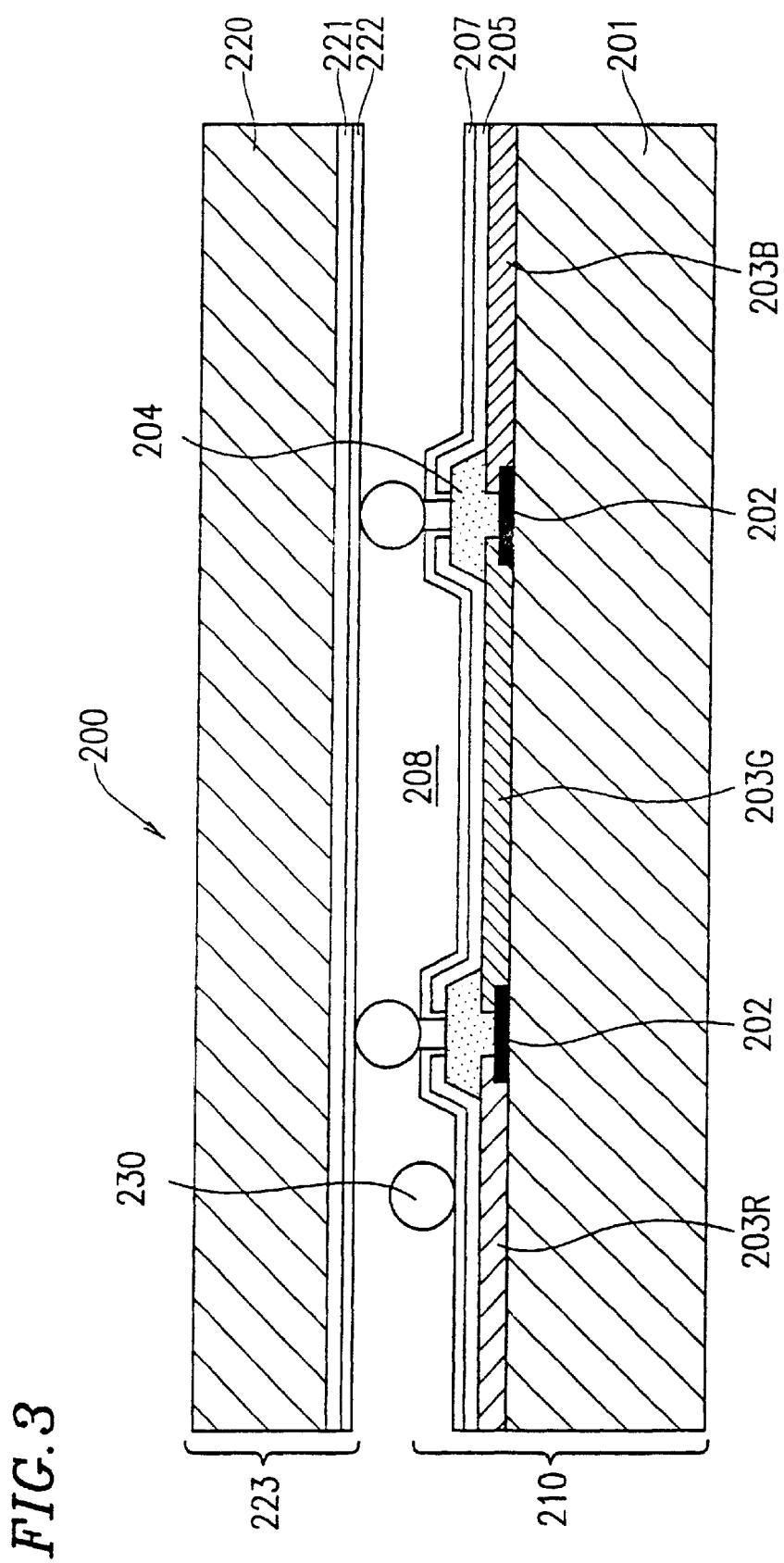
FIG. 3 is a schematic diagram illustrating a cross section of a liquid crystal display device according to Example 4 of the present invention.

FIG. 3 is a schematic diagram illustrating a cross section of a liquid crystal display device 200 according to Example 4 of the present invention.

Referring to FIG. 3, the liquid crystal display device 200 of Example 4 includes a glass substrate 201, and a black matrix (BM) 202 and R, G and B colored resin layers 203R, 203G and 203B formed on the glass substrate 201. The liquid crystal display device 200 further includes an overcoat layer 204 about 1.0 μm thick which is formed selective on the black matrix (BM) 202 and the colored resin layers 203R, 203G and 203B. A transparent electrode 205 of ITO is provided on the colored resin layers 203R, 203G and 203B and the overcoat layer 204. It is designed so that the transparent electrode 205 is partially etched away from over the overcoat layer 204.

The side of the overcoat layer 204 is inclined. The inclination angle should be about 45° or less so as to prevent disconnection of the transparent electrode 205, and about 5° or more so that the inclined portion functions as a polymer wall for orienting the liquid crystal molecules in axial symmetry. The overcoat layer 204 which also functions as a polymer wall provides an anchoring force to a liquid crystal region 208 so that the liquid crystal molecules in the liquid crystal region 208 are oriented in axial symmetry. According to Example 3, each liquid crystal region 208 defined by the overcoat layer 204 has a size of about 160 μm×140 μm.

The surface of a color filter substrate 210 is covered with a vertical alignment film 207, and the surface of a counter electrode 221 of ITO formed on the surface of a counter substrate 223 is covered with a vertical alignment film 222. The gap between the color filter substrate 210 and the counter substrate 223 is defined by spacer beads (having a diameter of about 4.5 μm) existing on the polymer wall (overcoat layer 204), so as to obtain a desirable cell gap.

A method for producing the liquid crystal display device 200 will be described below with reference to FIGS. 4A to 4F.

Figure 4A:
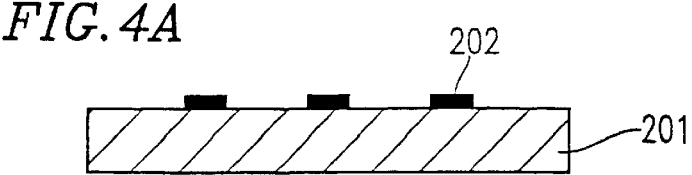
FIGS. 4A to 4F illustrate a method for producing the liquid crystal display device according to Example 4 of the present invention.

First, referring to FIG. 4A, the black matrix (BM) 202 is formed on the glass substrate 201 for blocking light passing through a gap between adjacent ones of the R, G and B colored portions (step 4a). A material for the BM 202 may be obtained by patterning a thin metal film of Cr about 100 nm thick by photolithography.

Figure 4B:
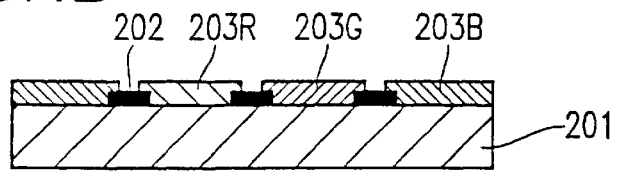

Then, referring to FIG. 4B, the R, G and B colored resin layers 203R, 203G and 203B are successively formed on the glass substrate 201 having the BM 202 formed thereon (step 4b). Each of the colored resin layers 203R, 203G and 203B may be about 1.0 μm thick, and formed by first spin-coating a material on the substrate 201 and then patterning the applied material by photolithography into a predetermined pattern.

Figure 4C:
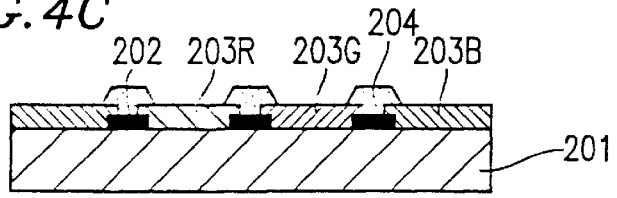

Then, referring to FIG. 4C, the overcoat layer 204 is formed by first spin-coating a photosensitive overcoat material to be about 1.0 μm thick, and then patterning the applied material by photolithography using a mask having a polymer wall pattern (step 4c).

Figure 4D:
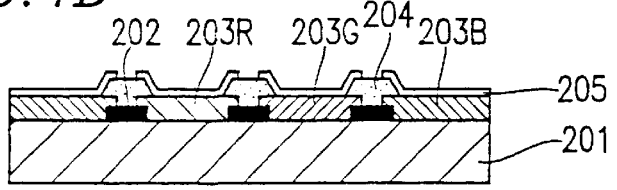

Then, referring to FIG. 4D, an ITO film is deposited by sputtering to be about 300 nm thick, and the ITO film is patterned by photolithography and wet-etched with a ferric chloride type etchant, thereby forming the transparent electrode 205 (step 4d). It is designed so that the overcoat layer 204 exists under each region where the ITO film is etched away, whereby the colored resin layers 203R, 203G and 203B or the BM 202 will not be etched by the etchant. Each liquid crystal region 208 defined by the overcoat layer 204 has a size of about 160 μm×140 μm.

Figure 4E:
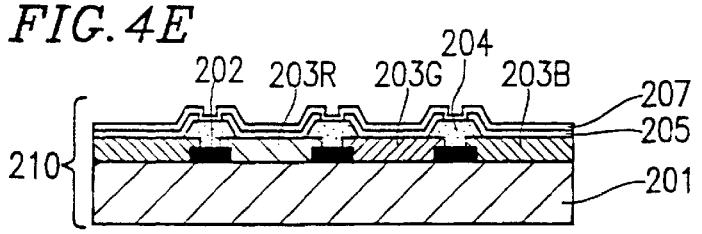

Then, referring to FIG. 4E, an alignment film material (e.g., "JALS-204" manufactured by Japan Synthetic Rubber Ltd.) is spin-coated across the entire surface of the substrate, so as to form the vertical alignment film 207, thereby producing the color filter substrate 210 (step 4e).

Figure 4F:
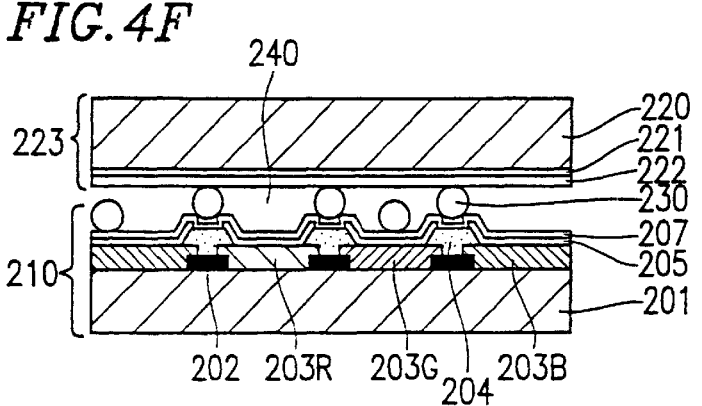

The subsequent steps are substantially the same as those described above in Example 2, and thus will not further be described below. Following the subsequent steps, the liquid crystal display device 200 is produced, as illustrated in FIG. 4F, which includes the color filter substrate 210 and the counter substrate 223 interposing a liquid crystal layer 240 therebetween.

According to Example 4, as in Example 2, there is no substantial disturbance in the orientation of the liquid crystal molecules due to the spacer beads, and no substantial deterioration in the viewing angle characteristic. According to Example 4, the overcoat layer 204 also functions as a polymer wall, whereby it is possible to reduce the number of steps by one as compared to that of Example 2, thereby simplifying the production process and reducing the production time. In addition, the number of layers existing on each colored layer is reduced by one from that of Example 2, thereby also improving the light transmission of the panel.

EXAMPLE 5

Figure 5:
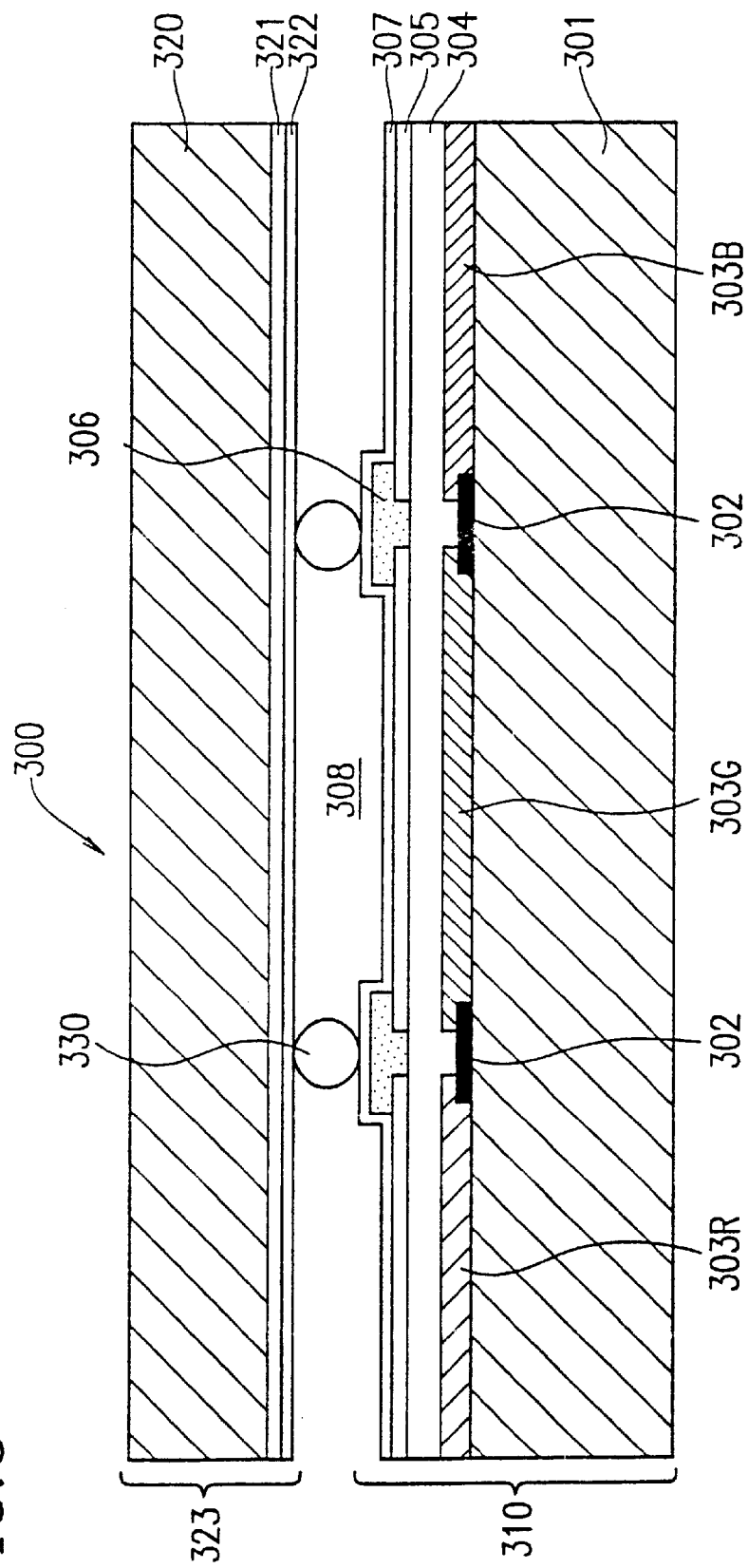
FIG. 5 is a schematic diagram illustrating a cross section of a liquid crystal display device according to Example 5 of the present invention.

FIG. 5 is a schematic diagram illustrating a cross section of a liquid crystal display device 300 according to Example 5 of the present invention.

Referring to FIG. 5, Example 5 is substantially the same as Example 2 described above, except that substantially no spacer beads exist within a liquid crystal region 308 surrounded by a polymer wall 306.

With the structure of Example 2 as illustrated in FIG. 1, the size of the liquid crystal region 9 may not be sufficiently reduced in view of the possibility that some of the spacer beads 130 may remain in the liquid crystal region 9. Therefore, experiments were conducted to study the spacer beads dispersion density which is required for properly defining the cell gap, and to study the minimum size of the liquid crystal region which does not allow the orientation of the liquid crystal molecules to be disturbed when a single spacer bead 130 remains in the liquid crystal region. As a result, it was found that the size of the liquid crystal region needs to be at least about 50 μm×50 μm.

However, with the structure of Example 5 as illustrated in FIG. 5, substantially no spacer beads 330 exist in the liquid crystal region 308, whereby the size of the liquid crystal region 308 can be smaller than the minimum size of the liquid crystal region 9 of Example 2. As the size of the liquid crystal region 308 is reduced, the anchoring force of the polymer wall 306 for orienting the liquid crystal molecules in axial symmetry substantially increases, thereby stabilizing the orientation and improving the viewing angle characteristic. According to Example 5, the size of the liquid crystal region 308 defined by the polymer wall 306 is about 30 μm×30 μm.

A method for producing the liquid crystal display device 300 will be described below with reference to FIGS. 6A to 6G. The steps (steps 6a to 6d) illustrated in FIGS. 6A to 6D (for forming a BM 302, colored layers 303R, 303G and 303B, an overcoat layer 304 and a transparent electrode 305 on a glass substrate 301) are substantially the same as those illustrated in FIGS. 2A to 2D (steps 2a to 2d). Therefore, these steps will not further be described, and only steps that are different will be described below.

Figure 6A:
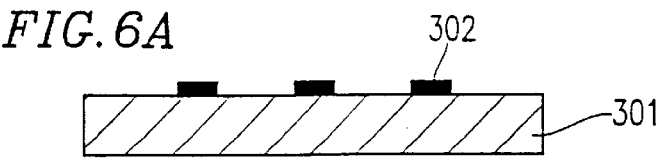
FIGS. 6A to 6G illustrate a method for producing the liquid crystal display device according to Example 5 of the present invention.
Figure 6B:
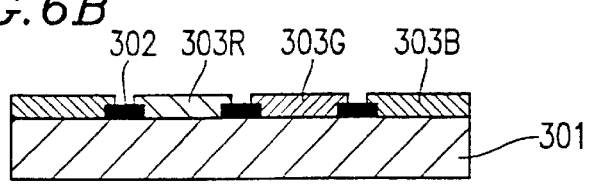
Figure 6C:
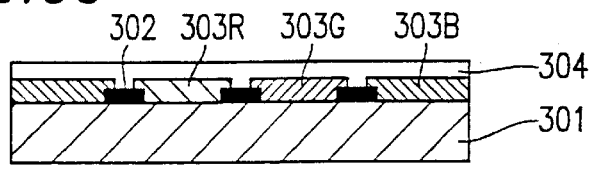
Figure 6D:
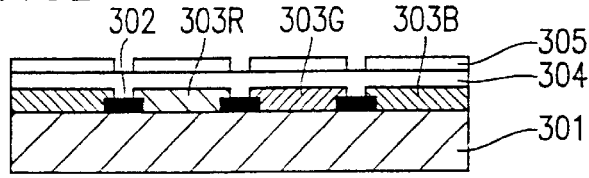
Figure 6E:
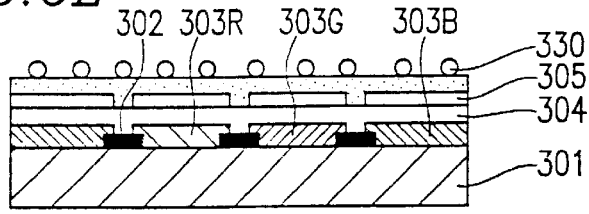

Referring to FIG. 6E, a photosensitive transparent acrylic resin material is spin-coated to be about 0.5 μm thick on the color filter substrate 301 having the transparent electrode 305 formed thereon as illustrated in FIG. 6D. Thereafter, the spacer beads 330 having a diameter of about 5.5 μm are dispersed by a dry method on the acrylic resin (step 6e).

Figure 6F:
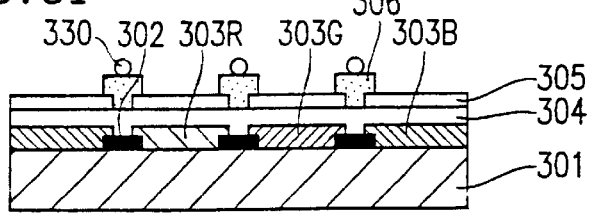

Then, referring to FIG. 6F, the acrylic resin is exposed and developed using a mask having a predetermined polymer wall pattern. Thereafter, the spacer beads 330 existing in the liquid crystal region are selectively removed while leaving the spacer beads 330 only on the polymer walls 306 (step 6f).

Figure 6G:
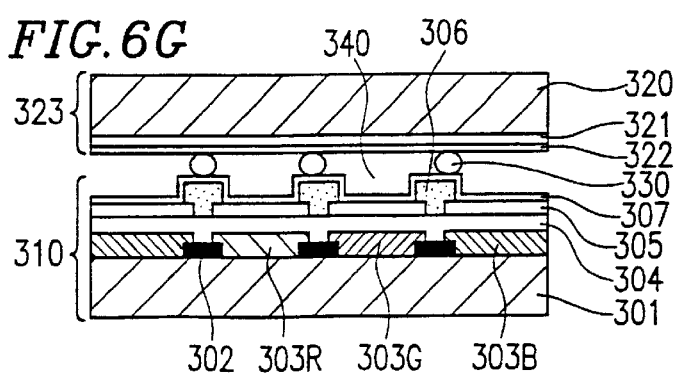

The subsequent steps are substantially the same as those described above in Example 2, and thus will not further be described below. Following the subsequent steps, the liquid crystal display device 300 is produced, as illustrated in FIG. 6G, which includes a color filter substrate 310 and a counter substrate 323 interposing a liquid crystal layer 340 therebetween (step 6g).

Due to the reduced size of the liquid crystal region 308, the liquid crystal display device 300 has an increased anchoring force to the liquid crystal molecules. As a result, the viewing angle characteristic does not substantially vary from different azimuth directions, and a viewing angle of about 160° or more is realized in any azimuth direction.

EXAMPLE 6

Figure 7:
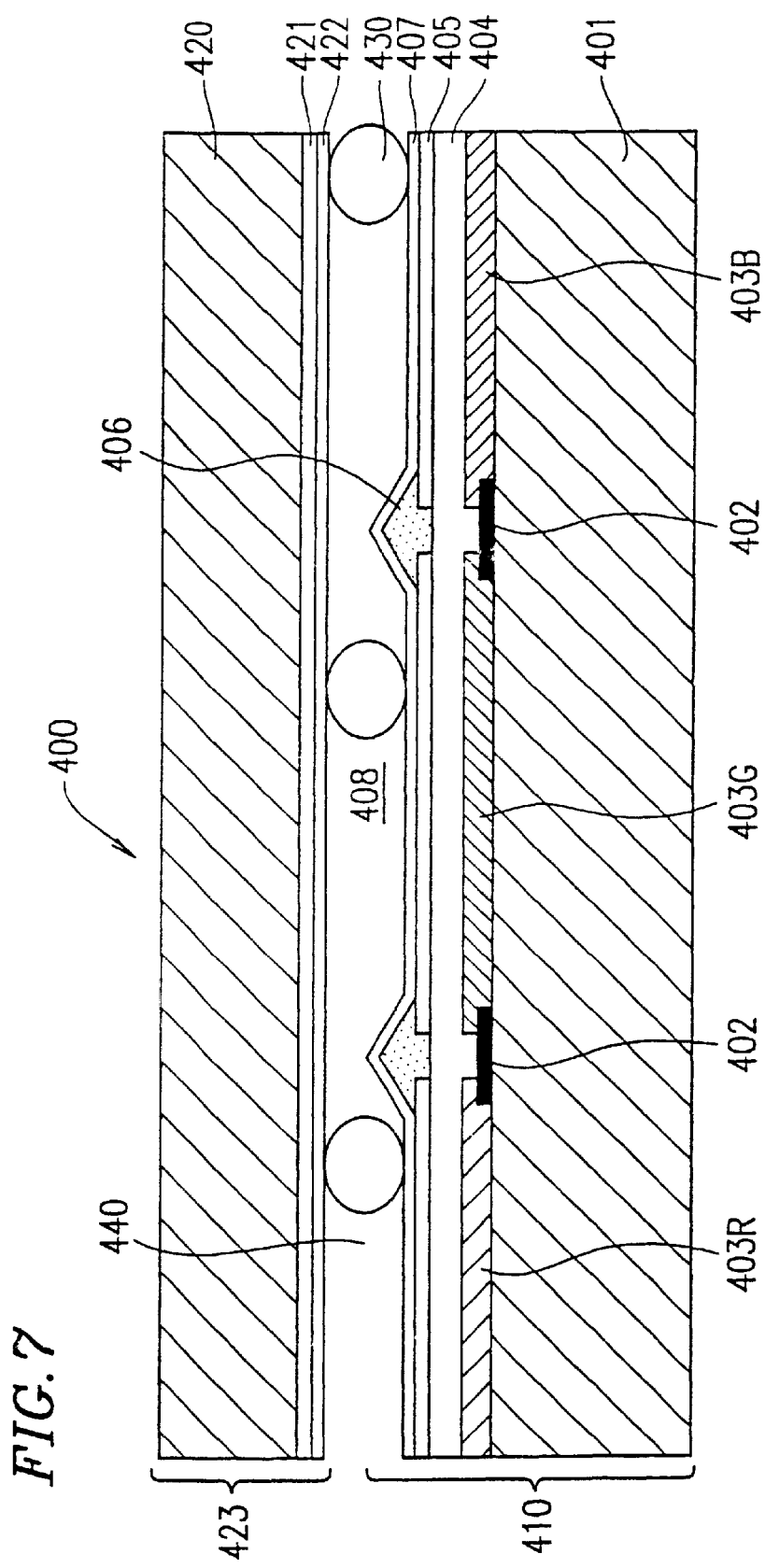
FIG. 7 is a schematic diagram illustrating a cross section of a liquid crystal display device according to Example 6 of the present invention.

FIG. 7 is a schematic diagram illustrating a cross section of a liquid crystal display device 400 according to Example 6 of the present invention.

Referring to FIG. 7, the liquid crystal display device 400 of Example 6 includes a color filter substrate 410, a counter substrate 423 and a liquid crystal layer 440 interposed between the substrates 410 and 423. Example 6 is different from Example 2 as illustrated in FIG. 1 in that a polymer wall 406 has a top portion which is inclined and that the thickness of the liquid crystal layer 440 is defined by spacer beads 430 which exist in a region where there is no polymer wall 406. Other than this, Example 6 is substantially the same as Example 2.

More particularly, the liquid crystal display device 400 includes polymer walls 406 (for orienting the liquid crystal molecules in axial symmetry) formed on a transparent electrode 405. Each polymer wall 406 has a height of about 1.5 $\mu$m, an inclination angle of about 12° and a bottom width of about 15 $\mu$m. The size of a liquid crystal region 408 is about 200 $\mu$m×200 $\mu$m. The surface of the color filter substrate 410 and the surface of the counter substrate 423 are covered with vertical alignment films 407 and 422, respectively. The cell gap between the color filter substrate 410 and the counter substrate 423 is defined by the resin spacer beads 430 having a diameter of about 6.0 $\mu$m existing in the liquid crystal region 408.

A method for producing the liquid crystal display device 400 will be described below with reference to FIGS. 8A to 8F. The steps (steps 8a to 8d) illustrated in FIGS. 8A to 8D (for forming a BM 402, colored layers 403R, 403G and 403B, an overcoat layer 404 and a transparent electrode 405 on a glass substrate 401) are substantially the same as those illustrated in FIGS. 2A to 2D (steps 2a to 2d). Therefore, these steps will not further be described, and only steps that are different will be described below.

Figure 8A:
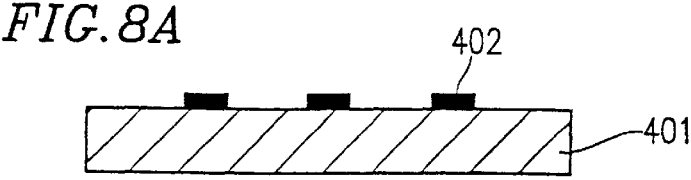
FIGS. 8A to 8F illustrate a method for producing the liquid crystal display device according to Example 6 of the present invention.
Figure 8B:
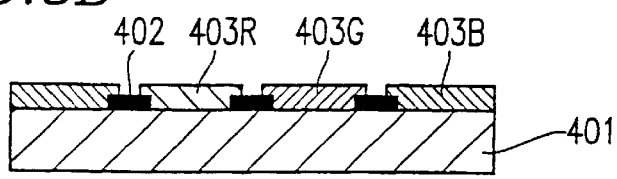
Figure 8C:
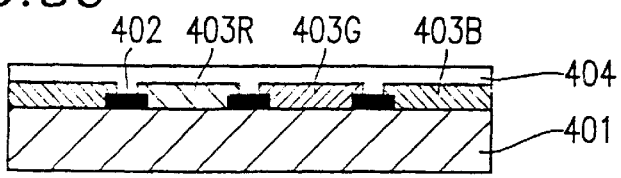
Figure 8D:
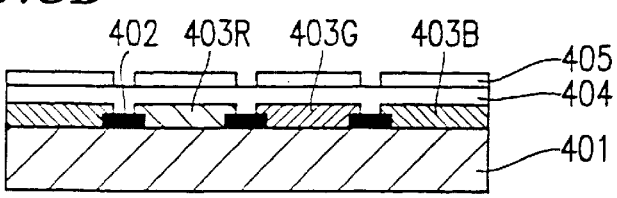
Figure 8E:
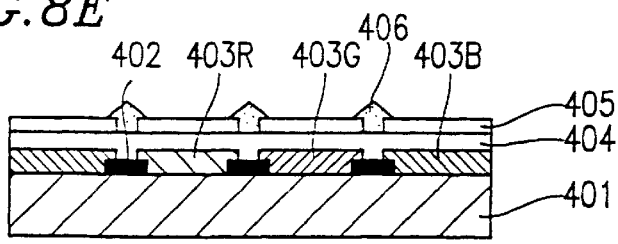

Referring to FIG. 8E, a photosensitive transparent acrylic resin material is applied by a wire bar coat method to be about 1.5 $\mu$m thick on the color filter substrate 401 having the transparent electrode 405 formed thereon as illustrated in FIG. 8D. Thereafter, the polymer wall 406 is formed to have a triangular cross section with an inclination angle of about 10° or more by optimizing the proxy gap of the proximity exposure, the prebake temperature after the application of the material and the conditions for the post-development rinse process using a high pressure water (step 8e). The bottom width of the polymer wall 406 is about 15 $\mu$m, and the size of the liquid crystal region 408 defined by the polymer wall 406 is about 200 $\mu$m×200 $\mu$m.

Figure 8F:
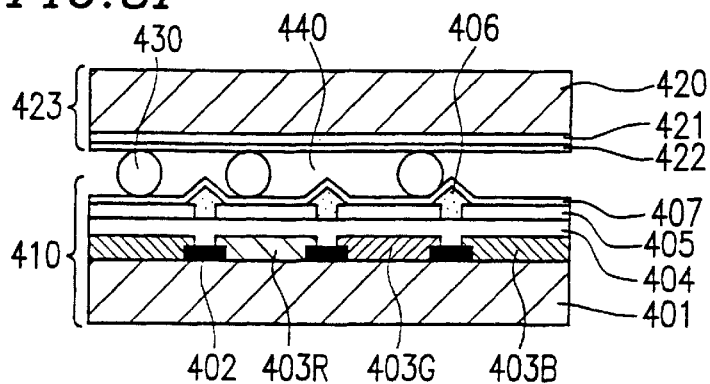

Then, referring to FIG. 8F, the vertical alignment films 407 is formed on the color filter substrate 410 having the polymer walls 406 formed thereon as illustrated in FIG. 8E. Similarly, vertical alignment film 422 is formed on the counter substrate 423, as illustrated in FIG. 8F.

Then, the resin spacer beads 430 having a diameter of about 6.0 $\mu$m are dispersed across the entire surface of the counter substrate 423, and the substrates 410 and 423 are attached together. Due to the pressure applied during the attachment, the spacer beads 430 located on the polymer walls 406 move down along the inclined surface of the polymer wall 406 into the liquid crystal region 408. The spacer bead dispersion density is set to about 3 groups/0.01 $\mu$m² taking into account the movement of the spacer beads 430 on the polymer wall 406 into the liquid crystal region 408. Thereafter, through the subsequent steps which are substantially the same as those in Example 2, the liquid crystal display device 400 is produced (step 8f). The liquid crystal display device 400 has substantially no light leakage in the absence of an applied voltage and substantially no disturbance in the orientation of the liquid crystal molecules in the presence of an applied voltage.

In the structure of Example 2 as illustrated in FIG. 1, the thickness of the liquid crystal layer 140 is defined by the spacer beads 130 which exist on the polymer walls 6. In such a structure, any variation in the height of the polymer walls 6 across the liquid crystal cell is a variation in the cell gap of the liquid crystal cell, thereby reducing the display quality such as the light transmission uniformity and the color uniformity.

However, in the structure of Example 6 as illustrated in FIG. 7, the thickness of the liquid crystal layer 440 is defined by the spacer beads 430 which exist in a region where there is no polymer wall 406. Thus, even when there occurs a variation in the height of the polymer walls 406 across the liquid crystal cell, such a variation does not directly result in a variation in the cell gap. Therefore, it is not necessary to control the uniformity in the thickness of the polymer wall 406 as strictly as in Example 2. Accordingly, the polymer walls 406 can be applied by a method such as a wire bar coat method, which has a relatively poor thickness uniformity but allows a resist to be used more efficiently as compared with the spin-coating method. Thus, it is possible to reduce the material cost, and to more easily produce a liquid crystal cell having a uniform and desirable display quality.

EXAMPLE 7

Figure 13:
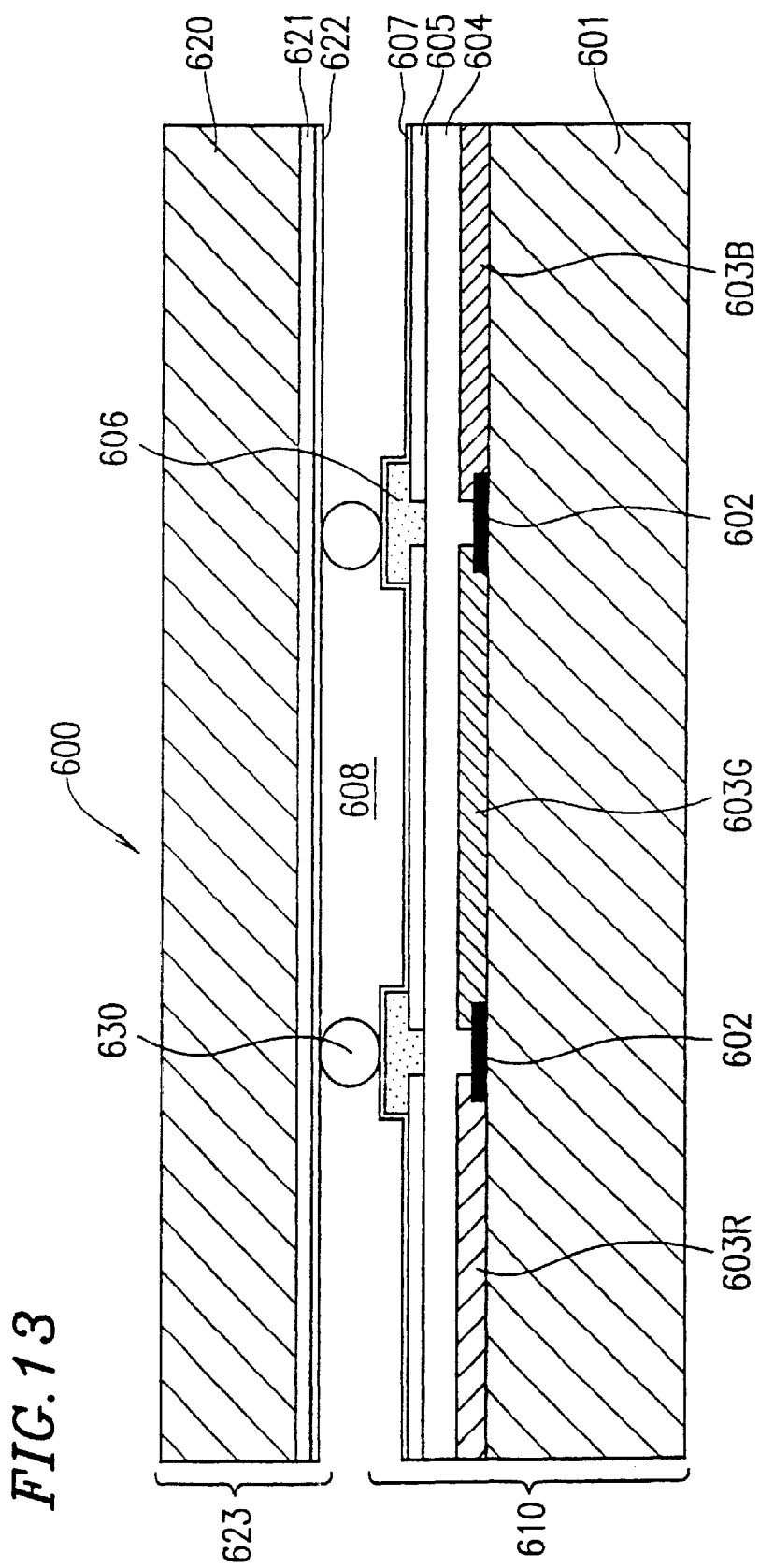
FIG. 13 is a schematic diagram illustrating a cross section of a liquid crystal display device according to Example 7 of the present invention.

FIG. 13 is a schematic diagram illustrating a cross section of a liquid crystal display device 600 according to Example 7 of the present invention.

Referring to FIG. 13, the liquid crystal display device 600 of Example 7 includes a glass substrate 601 and a black matrix (BM) 602 and R, G and B colored resin layers 603R, 603G and 603B formed on the glass substrate 601. The liquid crystal display device 600 further includes an overcoat layer 604 for protecting and flattening the surface of the black matrix (BM) 602 and the colored resin layers 603R, 603G and 603B. A transparent electrode 605 of ITO and polymer walls 606 (which are provided for orienting the liquid crystal molecules in axial symmetry) are provided on the overcoat layer 604. The liquid crystal region 608 is defined by the polymer wall 606. The liquid crystal molecules in each liquid crystal region 608 are subject to the anchoring force of the polymer wall 606 substantially surrounding the liquid crystal region 608, whereby the liquid crystal molecules are oriented in axial symmetry. The surface of the transparent electrode 605 and the surface of the polymer wall 606 are covered with a vertical alignment film 607, and the surface of a counter electrode 621 of ITO on the surface of a counter substrate 623 is covered with a vertical alignment film 622. The gap (the cell gap) between a color filter substrate 610 and the counter substrate 623 is defined by spacer beads 630 having a diameter of about 5.0 μm which exist on top of the polymer wall 606. The surface of each spacer bead 630 is coated with an adhesive material.

A method for producing the liquid crystal display device 600 will be described below with reference to FIGS. 14A to 14G.

Figure 14A:
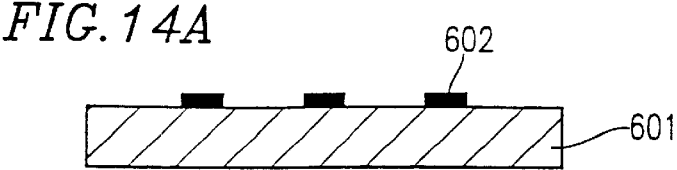
FIGS. 14A to 14G illustrate a method for producing the liquid crystal display device according to Example 7 of the present invention.

First, referring to FIG. 14A, the BM layer 602 is formed on the glass substrate 601 for blocking light passing through the gap between adjacent ones of the R, G and B colored portions (step 14a). A material for the BM 602 may be obtained by dispersing carbon particles in an acrylic photosensitive resin.

Figure 14B:
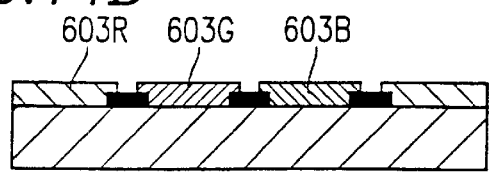

Then, referring to FIG. 14B, the R, G and B colored resin layers 603R, 603G and 603B are successively formed on the glass substrate 601 having the BM 602 formed thereon (step 14b). The BM 602 and each of the colored resin layers 603R, 603G and 603B may both be about 1.0 μm thick, and formed by first spin-coating a material on the substrate 601 and then patterning the applied material by photolithography into a predetermined pattern.

Figure 14C:
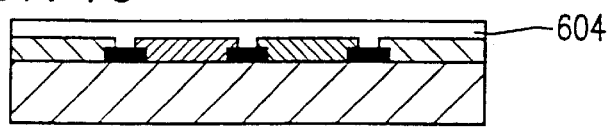

Then, referring to FIG. 14C, the overcoat layer 604 is spin-coated to be about 2.0 μm thick for protecting and flattening the surface of the BM 602 and the colored resin layers 603R, 603G and 603B (step 14c).

Figure 14D:
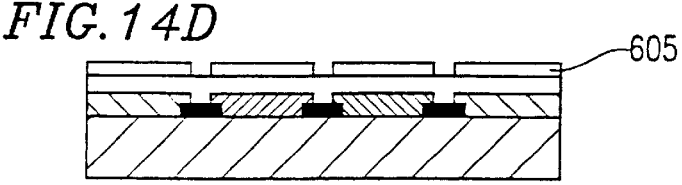

Then, referring to FIG. 14D, an ITO film is deposited on the overcoat layer 604 by sputtering to be about 300 nm thick, and the ITO film is patterned by photolithography and wet-etched with an aqua regia type etchant, thereby forming the transparent electrode 605 (step 14d).

Figure 14E:
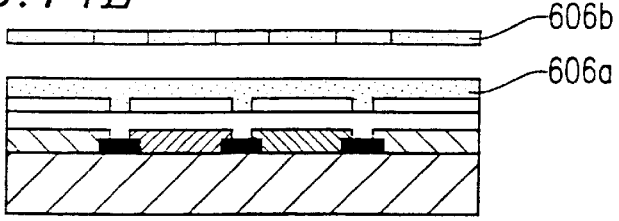

Then, referring to FIG. 14E, a photosensitive acrylic resin is spin-coated on the substrate to be about 1.0 μm thick to provide a polymer wall photosensitive material layer 606a, and pre-baked at about 100° C. for about 120 seconds. Thereafter, a proximity exposure process (proxy gap: about 50 μm) with ultraviolet rays is performed using a mask 606b having a predetermined polymer wall pattern (step 14e). After the exposure, the spacer beads 630 having a diameter of about 5.0 μm are dispersed by a dry method, and a heat treatment at about 125° C. and for about 60 seconds is performed for adjusting the sensitivity of the photosensitive material and securing the spacer beads 630. The surface of the spacer beads 630 is preferably coated with an adhesive material (e.g., a thermoplastic acrylic resin) which melts at about 120° C. to a thickness of about 30 nm.

Figure 14F:
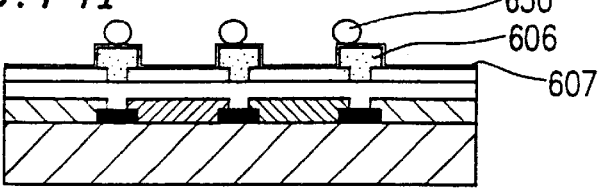

Then, referring to FIG. 14F, a development process is performed by using a developing solution (e.g., "CD" manufactured by FUJIFILM OLIN CO., LTD.) so as to form the polymer walls 606. After the development process, the spacer beads 630 exist only in a region where the polymer walls 606 remain. The spacer beads 630 in the liquid crystal region 608 are removed with the photosensitive material. Thereafter, an alignment film material (e.g., "JALS-204" manufactured by Japan Synthetic Rubber Ltd.) is spin-coated across the entire surface of the substrate, as illustrated in FIG. 14F, so as to form the vertical alignment film 607, thereby producing the color filter substrate 610 as illustrated in FIG. 2G (step 14f).

Figure 14G:
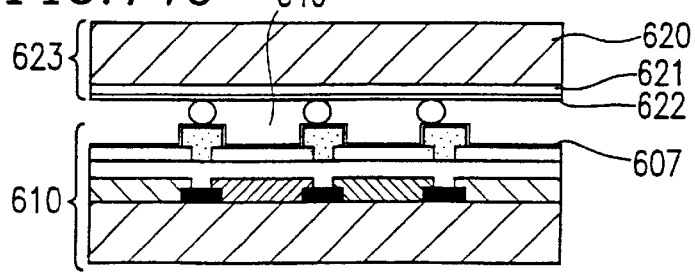
Figure 16:
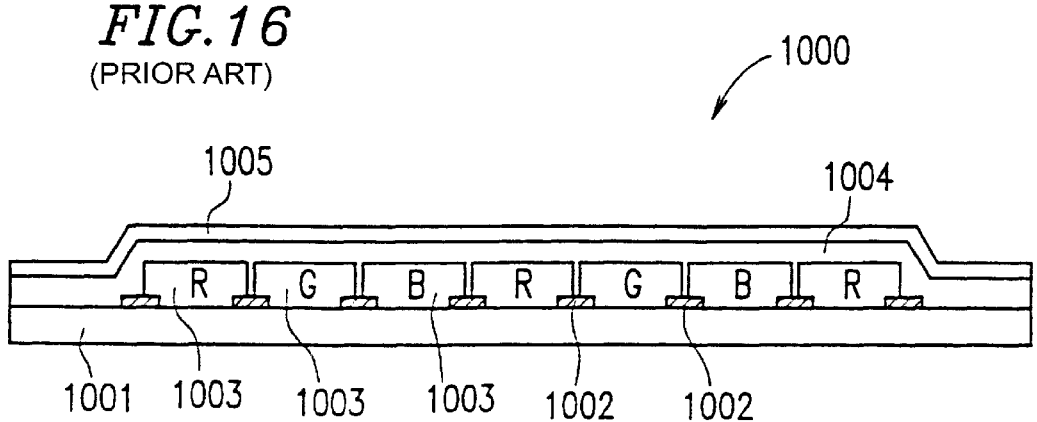
FIG. 16 is a schematic diagram illustrating a cross section of a conventional color filter.

Then, the color filter substrate 610 is attached to the counter substrate 623 as illustrated in FIG. 14G (which includes a glass substrate 620, the counter electrode 621 of ITO formed on the glass substrate 620, and the vertical alignment film 622 formed on the counter electrode 621). Thereafter, a liquid crystal material having a negative dielectric anisotropy is injected into a gap between the substrates 610 and 623 to provide a liquid crystal layer 640 between the substrates 610 and 623, thereby producing a liquid crystal cell (step 14g). For example, the liquid crystal material may be an n-type liquid crystal material ($\Delta\epsilon=-4.0$, $\Delta n=0.08$, with an addition of a chiral agent for adjusting a twist angle to 90° within a cell gap of about 6.0 μm).

According to Example 7, it is possible to prevent the spacer beads from contaminating the exposure apparatus or the production line used between the resist application step and the exposure step, and to further improve the production yield from those obtained according to other examples described above. Moreover, since the spacer beads are dispersed after the photosensitive material is baked, thereby reducing the defect due to the attachment of a foreign substance onto the photosensitive material before the baking process, and thus improving the production yield.

EXAMPLE 8

Example 8 of the present invention is directed to a dry film resist suitable for use with a liquid crystal display device of the present invention. The dry film resist of Example 8 will be described below in connection with the liquid crystal display device 50 described above in Example 1.

FIGS. 18A and 18B are a schematic crosssectional view and a schematic plan view, respectively, illustrating the liquid crystal display device 50. As described above, the liquid crystal display device 50 includes the glass substrate 1a, and the black matrix 2 and the R, G and B colored resin layers 3 (i.e., a color filter) formed on the glass substrate 1a. The liquid crystal display device 50 further includes the overcoat layer 4 formed on the color filter surface, the ITO signal electrode 5 formed on the overcoat layer 4, and the polymer walls 6 for orienting the liquid crystal molecules in axial symmetry. The overcoat layer 4 is provided to fill the gap between adjacent colored portions existing directly above the BM layer 2 and to protect the surface of the color filter. The ITO signal electrode 5 is provided by first sputtering an ITO film on the overcoat layer 4, and then patterning the sputtered ITO film. The polymer walls 6 are provided through a thermo-compression bonding process of a dry film resist of Example 8 onto the substrate 1a using a laminator.

Figure 25A:
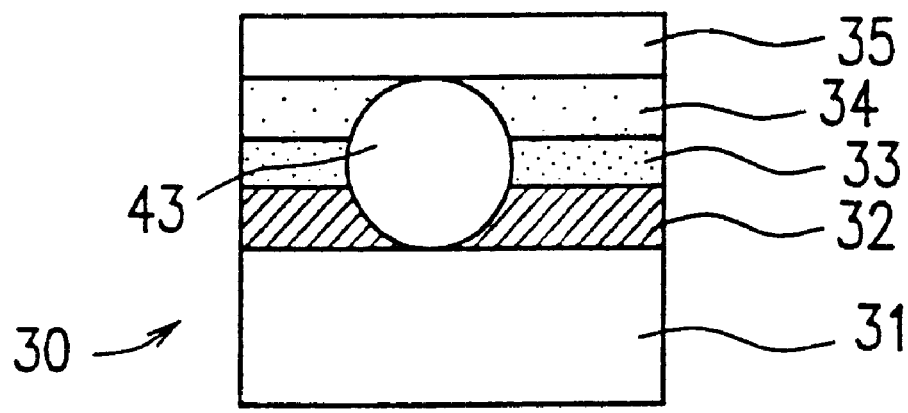
FIG. 25A is a schematic diagram illustrating a structure of a dry film resist according to an example of the present invention, where the bead diameter is substantially equal to the total thickness of a photosensitive resin layer, an oxygen blocking layer and a cushion layer.
Figure 25B:
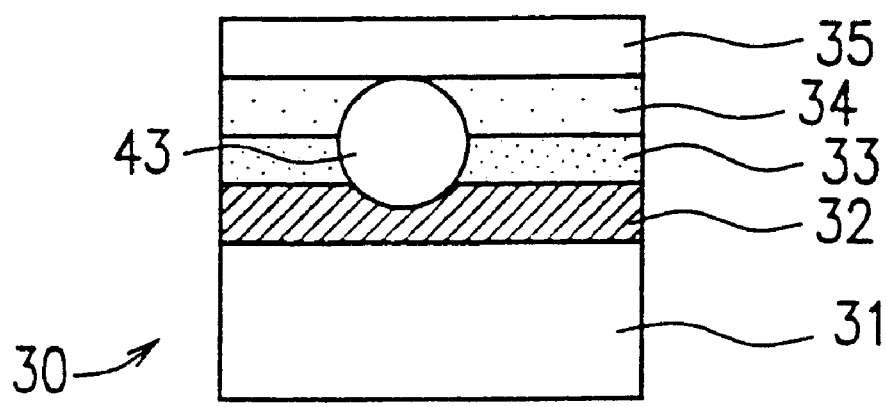
FIG. 25B is a schematic diagram illustrating a structure of a dry film resist according to an example of the present invention, where the bead diameter is smaller than the total thickness of a photosensitive resin layer, an oxygen blocking layer and a cushion layer.

FIGS. 25A and 25B illustrate alternative structures of a dry film resist 30 of the present invention. FIG. 25A illustrates a structure where the bead diameter is substantially equal to the total thickness of a photosensitive resin layer, an oxygen blocking layer and a cushion layer, and FIG. 25B illustrates another structure where the bead diameter is smaller than the total thickness of a photosensitive resin layer, an oxygen blocking layer and a cushion layer. The dry film resist 30 includes a base film 31 having a thickness of about 75 μm and a transparent plastic spacer bead 43 having a diameter of about 5.5 μm dispersed on the base film 31. The dry film resist 30 further includes a cushion layer 32 (about 5 μm thick), an oxygen blocking film 33 (about 2 μm thick), a transparent photosensitive resin layer 34 (about 1 μm thick) and a cover film 35 (about 20 μm thick), which are layered in this order on the base film 31. The spacer bead 43 may have any appropriate shape, preferably a spherical shape. By mixing the spacer beads 43 in the dry film resist 30, the shape conformability for the compression bonding process of the dry film resist 30 is improved, whereby the thickness of the cushion layer 32 can be reduced to be smaller than that in the prior art. The polymer walls 6 are provided by using the photosensitive resin layer 34 as will be described below with reference to FIGS. 26A to 26D.

In Example 8, a negative type photosensitive resin material is used as the material of the photosensitive resin layer 34 (i.e., a polymer wall material). When a positive resist is used as the polymer wall material, a portion of the resist directly under the spacer bead 43 may not be sufficiently exposed to light. As a result, some spacer beads 43 may remain in a region (the pixel aperture) where the spacer beads 43 should not remain.

The liquid crystal display device 50 further includes a vertical alignment layer (not shown) covering the polymer walls 6 and the spacer beads 43 formed on the glass substrate 1. The vertical alignment layer may be formed by spin-coating a material (e.g., "JALS-204" manufactured by Japan Synthetic Rubber Ltd.).

The polymer wall 6 includes an inclined or tapered portion having an inclination angle (or an upward taper angle) of θ with respect to the substrate surface. The inclination angle θ of the polymer wall 6 is preferably about 5° to about 45° so as to realize a stable axially symmetrical orientation. When the inclination angle θ of the polymer wall 6 is smaller than about 5°, the wall surface effect (an effect of stably orienting the liquid crystal molecules in axial symmetry) may be lost. Thus, the inclination angle θ of the polymer wall 6 is preferably about 5° or more.

A method for producing a color liquid crystal display device using the dry film resist 30 according to Example 8 of the present invention will be described with reference to FIGS. 19A to 19E.

First, the black matrix (BM) 2 is formed on the glass substrate 1a for blocking light passing through a gap between adjacent colored portions (FIG. 19A). The BM 2 may be formed of a material obtained by dispersing carbon particles in an acrylic photosensitive resin. Then, the R, G and B colored resin layers 3 are successively formed (FIG. 19B). The BM 2 and each of the colored resin layers 3 may both be about 1.0 μm thick, and are formed by first spin-coating a material on the glass substrate 1a and then patterning the applied material by photolithography into a predetermined pattern.

Then, the overcoat layer 4 is spin-coated to be about 2.0 μm thick, and an ITO film is sputtered to be about 3000 Å thick on the overcoat layer 4. The ITO film is patterned to form the ITO signal electrode 5 (FIG. 19C).

Then, the polymer wall 6 pattern is transferred by photolithography (FIG. 19D). The polymer walls 6 are provided through a thermo-compression bonding process of the dry film resist 30 onto the substrate 1a using a laminator. As illustrated in FIG. 25A and 25B, the dry film resist 30 includes a transparent plastic spacer bead having a diameter of about 5.5 μm. The process of producing the polymer walls 6 will be described below with reference to FIGS. 26A to 26D.

Figure 26A:
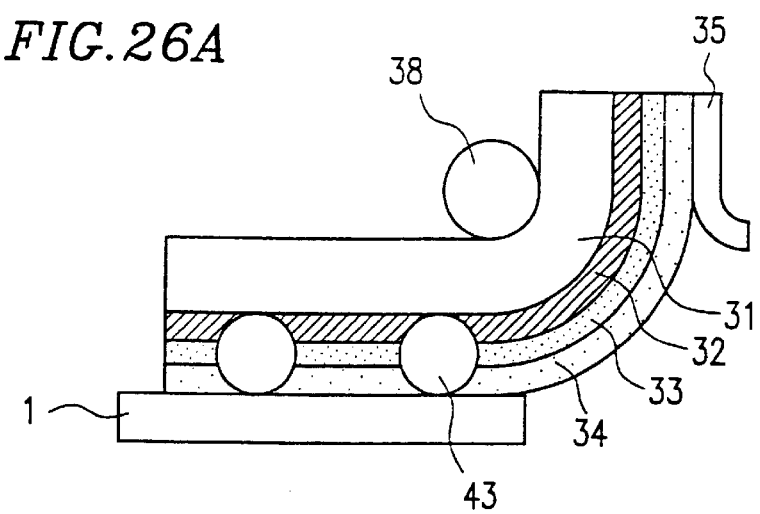
FIGS. 26A to 26D illustrate a process of producing a polymer wall using a dry film resist of the present invention.

First, referring to FIG. 26A, the cover film 35 is peeled off the dry film resist 30, and the photosensitive resin layer 34 of the dry film resist 30 is attached to the substrate 1 through a thermo-compression bonding process using a laminator.

Figure 26B:
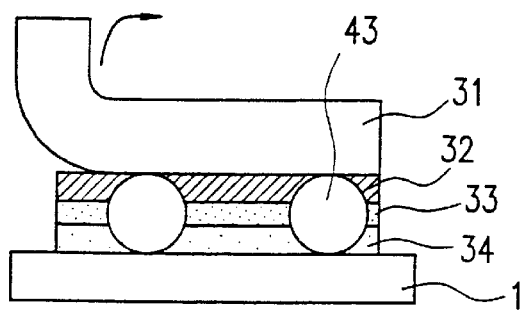

Then, referring to FIG. 26B, the base film 31 is peeled off the cushion layer 32, thereby providing a resist on the substrate 1.

Figure 26C:
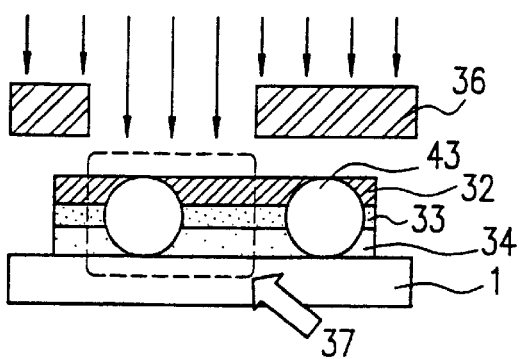

Then, referring to FIG. 26C, the provided resist is patterned by exposing an exposure region 37 by a proximity exposure process using a photomask 36 and ultraviolet rays. The exposure is performed under conditions such that a portion of the polymer wall material (i.e., a photosensitive resin) directly under the spacer bead 43 is sufficiently photo-polymerized by the ultraviolet rays.

Figure 26D:
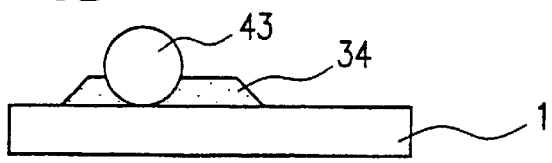

Then, referring to FIG. 26D, the patterned resist is developed with a developing solution (e.g., "CD" manufactured by FUJIFILM OLIN CO., LTD.), and rinsed with a high-pressure pure water spray. Thus, the spacer beads 43 remain only in a region where the polymer wall is formed (i.e., in a portion of the photosensitive resin layer 34 which has been photo-polymerized). Thereafter, a post-bake process is performed at about 240° C. for about 60 minutes.

The size of the liquid crystal region is about 150 μm×150 μm. The cross-sectional taper angle θ of polymer wall 6 is controlled to be about 5° to about 45° by adjusting the gap (the proxy gap) between the mask 36 and the substrate 1 in the proximity exposure process and optimizing the development condition. When the taper angle θ is smaller than about 5°, the anchoring force for orienting the liquid crystal molecules in axial symmetry may be weak, thereby considerably deteriorating the viewing angle characteristic. When the taper angle θ is larger than about 45°, the orientation of the liquid crystal molecules located in the vicinity of the polymer wall may be considerably disturbed, thereby considerably deteriorating the contrast in a black display due to light leakage.

Then, a polyimide resin (e.g., "JALS-204" manufactured by Japan Synthetic Rubber Ltd.) is spin-coated to form the vertical alignment film 8 on the glass substrate 1a. The vertical alignment film 8 is similarly formed on the counter substrate 1b. Thereafter, the counter substrate 1b is attached to the substrate 1a having a color filter (FIG. 19E).

Then, an n-type liquid crystal material (Δ∈=−4.0, Δn=0.08, with a twist angle inherent to the liquid crystal material adjusted to 90° twist within a cell gap of about 5.5 μm) is injected into the gap between the substrates 1a and 1b, thereby producing a liquid crystal cell.

Using the dry film resist 30 of Example 8, the resin layer and the spacer beads can be provided in a single process, thereby considerably reducing the number of steps required for the production process.

According to Example 8, it is possible to eliminate the need to provide the pillar-like protrusions (which are required to produce a conventional ASM mode liquid crystal display device), and to considerably improve the uniformity in the cell gap. Thus, it is possible to improve the display quality, reduce the cost (by reducing the number of steps), and to improve the production yield.

EXAMPLE 9

Figure 27A:
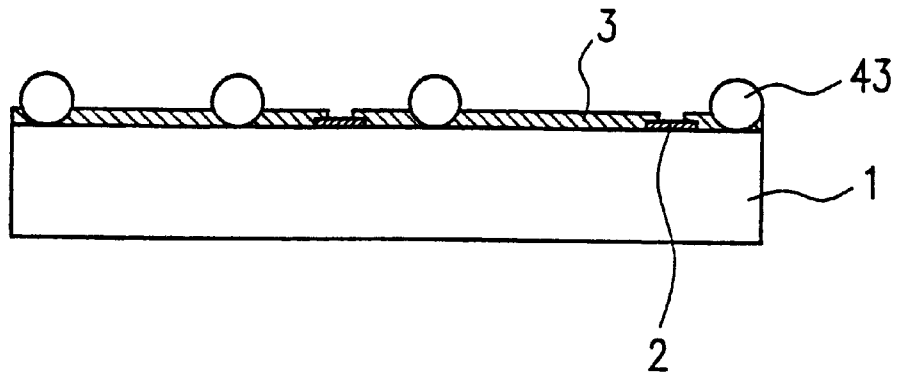
FIG. 27A is a schematic diagram illustrating a liquid crystal display device according to an alternative example of the present invention, where a dry film resist of the present invention is used as a color filter resist.
Figure 27B:
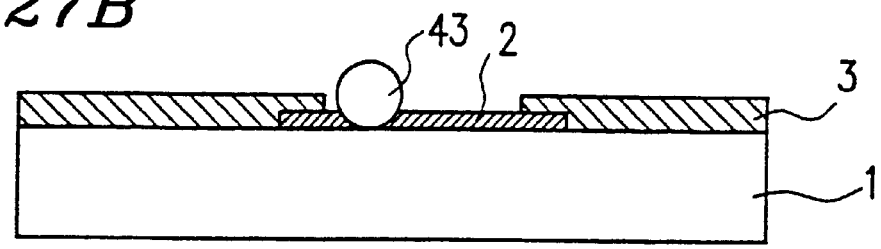
FIG. 27B is a schematic diagram illustrating a liquid crystal display device according to an alternative example of the present invention, where a dry film resist of the present invention is used as a black matrix resist.
Figure 28:
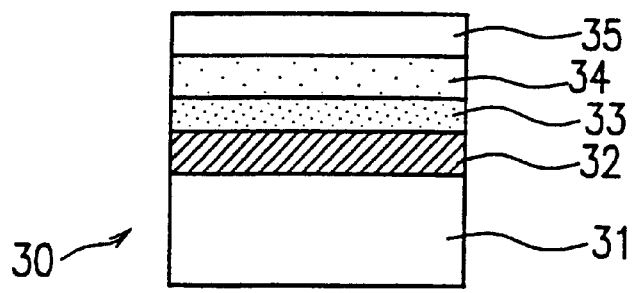
FIG. 28 is a schematic diagram illustrating a structure of a conventional dry film resist.
Figure 29:
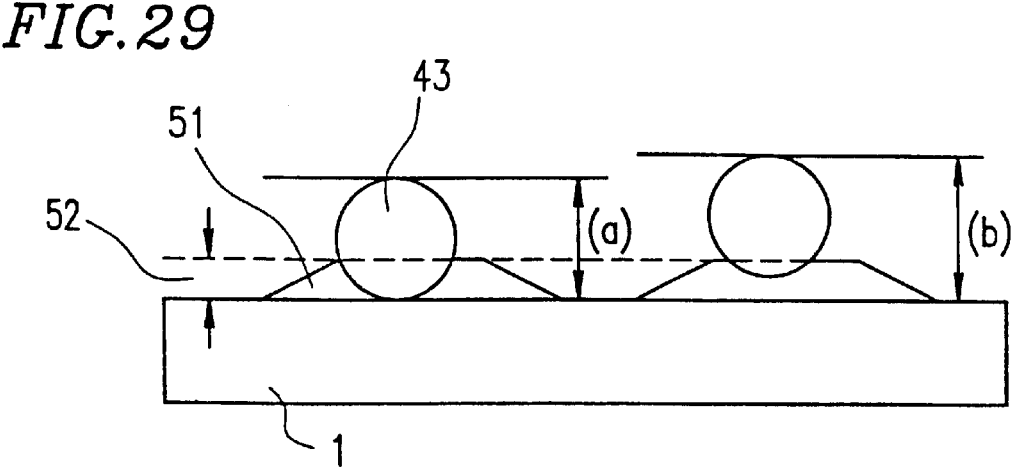
FIG. 29 shows a problem which may occur when spacer beads are mixed in a liquid resist and applied on a substrate.

As illustrated in FIGS. 27A and 27B, the dry film resist 30 of the present invention may be used to provide a resist for the R, G and B colored resin layers 3 and the black matrix layer 2, respectively, so as to produce a TN liquid crystal display device.

Comparative Example 1

Figure 20A:
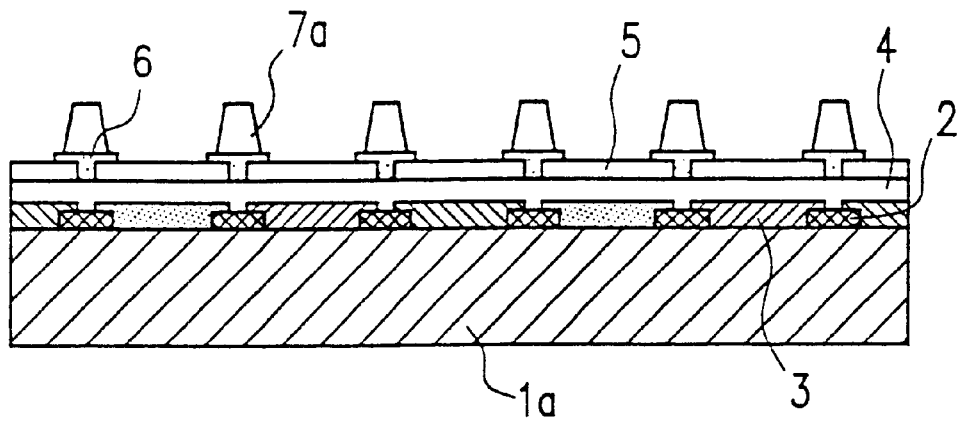
FIGS. 20A and 20B are a schematic cross-sectional view and a schematic plan view, respectively, illustrating one of a pair of substrates used in a liquid crystal display device according to Conventional Example 1.
Figure 20B:
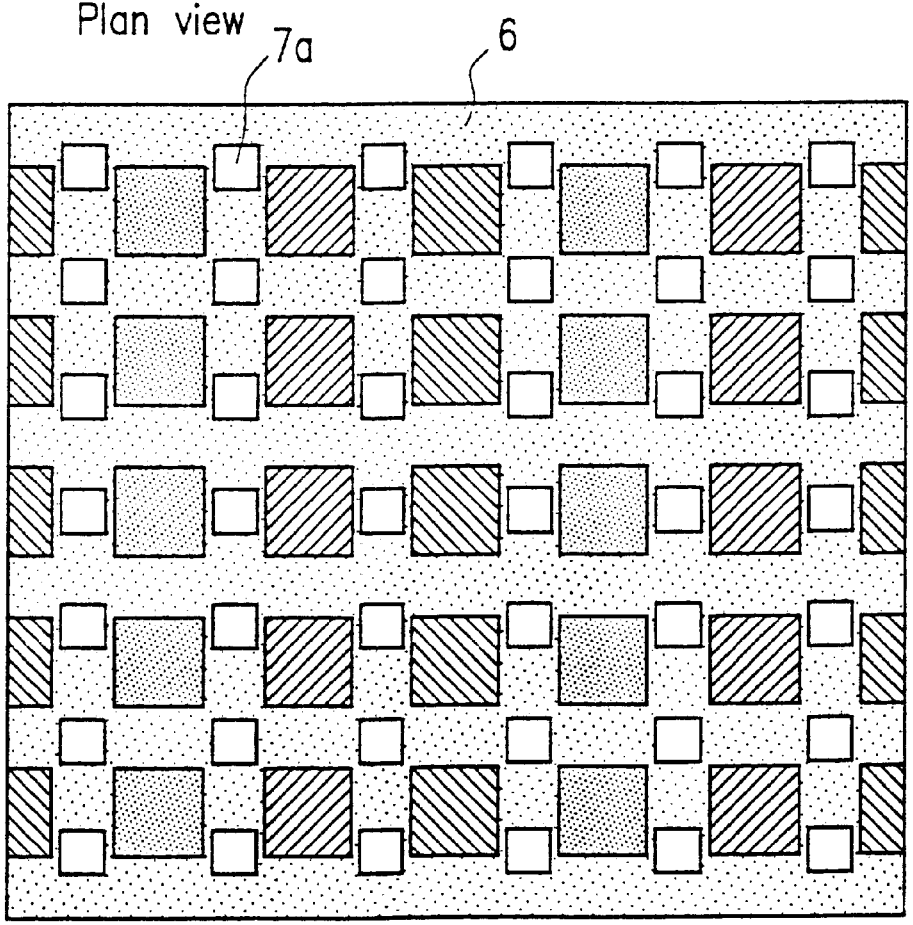

FIGS. 20A and 20B are a schematic cross-sectional view and a schematic plan view, respectively, illustrating one of a pair of substrates used in a liquid crystal display device according to Conventional Example 1. The liquid crystal display device employs a conventional ASM mode, but has an improved viewing angle characteristic.

The glass substrate 1a has a color filter formed thereon, which includes the R, G and B colored resin layers 3

(corresponding to one pixel) and the BM layer 2 for blocking light passing through a gap between adjacent colored portions. The overcoat layer 4 is provided on the color filter to fill the gap between adjacent colored portions existing directly above the BM layer 2 and to protect the surface of the color filter. The transparent electrode 5 of ITO is provided on the overcoat layer 4 as a signal electrode.

The polymer walls 6 are provided so as to surround each pixel, and pillar-like protrusions 7a, which define the cell gap, are provided on the polymer walls 6.

Figure 21A:
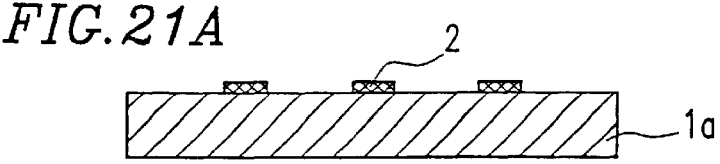
FIGS. 21A to 21F illustrate a method for producing the liquid crystal display device according to Conventional Example 1.
Figure 21B:
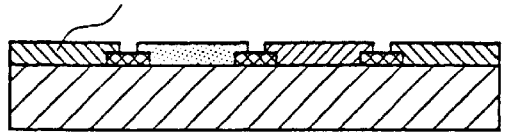
Figure 21C:
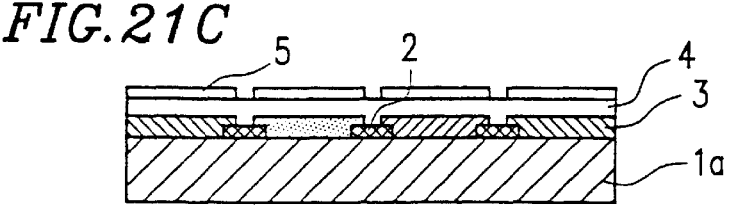
Figure 21D:
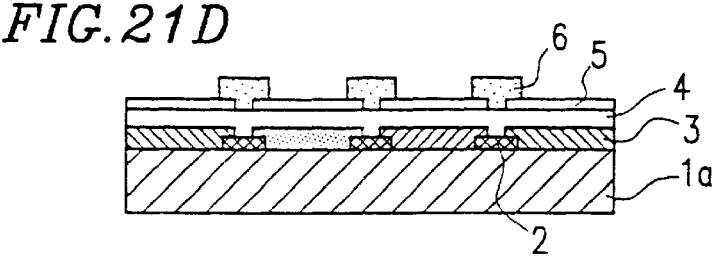
Figure 21E:
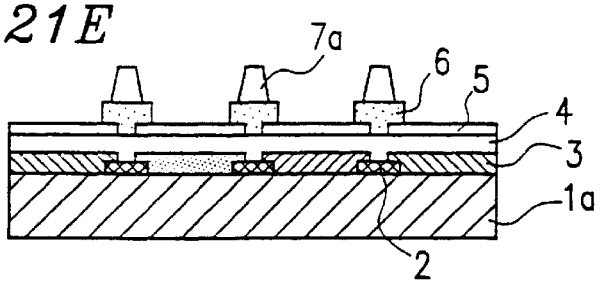
Figure 21F:
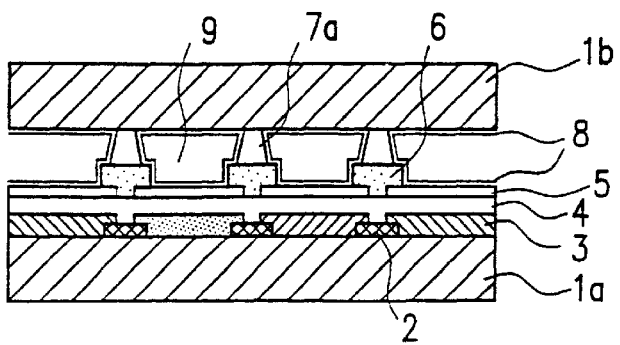
Figure 22A:
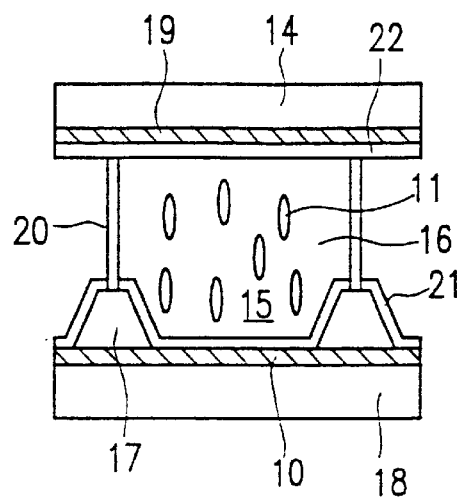
FIGS. 22A to 22D illustrate an operation principle of an ASM mode liquid crystal display device.
Figure 22C:
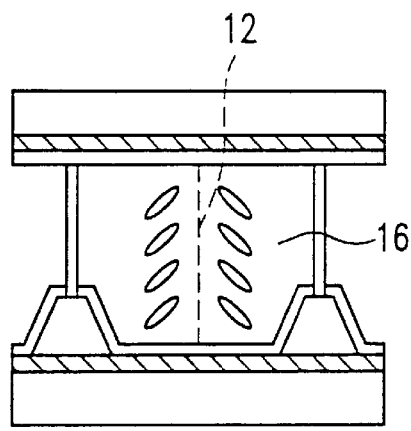
Figure 22B:
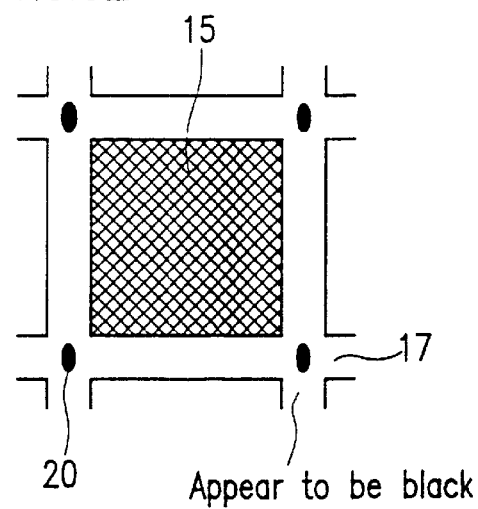
Figure 22D:
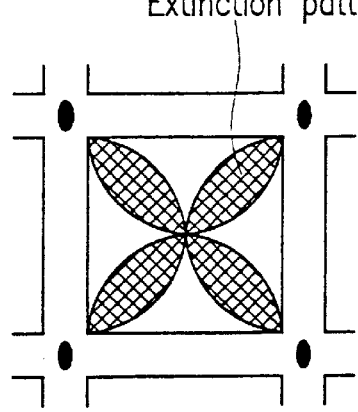
Figure 24A:
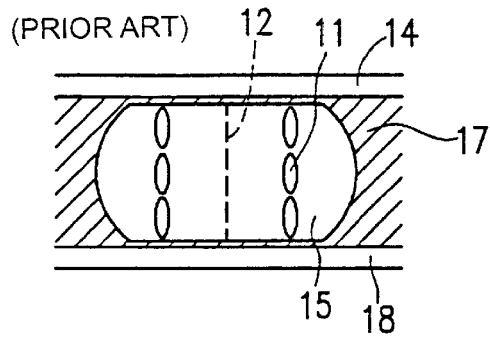
FIGS. 24A to 24C illustrate a viewing angle characteristic of an ASM mode liquid crystal display device.
Figure 24D:
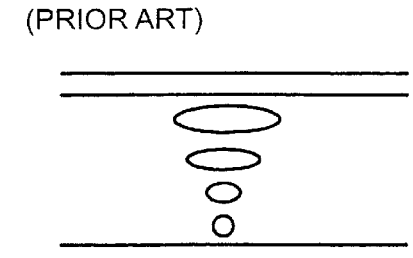
FIGS. 24D to 24F illustrate a viewing angle characteristic of a TN mode liquid crystal display device.
Figure 24B:
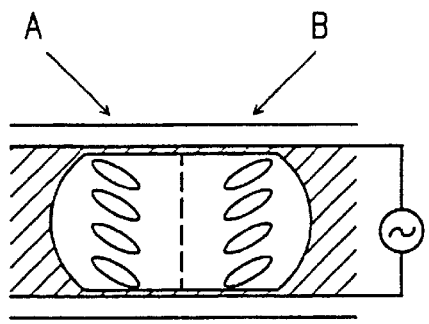
Figure 24E:
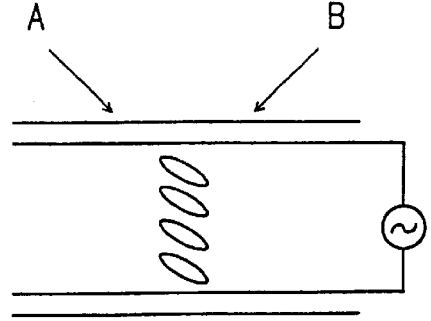
Figure 24C:
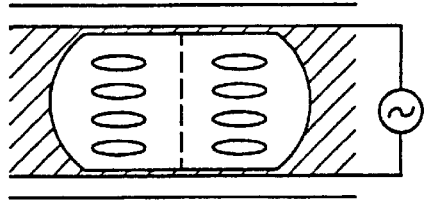
Figure 24F:
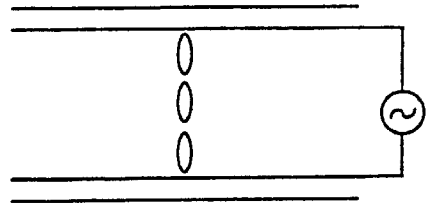

As illustrated in FIG. 21F, the vertical alignment film 8 is provided on the substrate, and the substrate is attached to the counter substrate 1b having the vertical alignment film 8 and the ITO electrode (not shown) formed thereon. A liquid crystal layer of a liquid crystal material having a negative dielectric anisotropy is interposed between the substrates, and each region surrounded by the polymer walls 6 is defined as the liquid crystal region 9.

The liquid crystal display device can be produced as follows.

First, referring to FIGS. 21A and 21B, the BM layer 2 and the R, G and B colored resin layers 3 are successively patterned on the glass substrate 1a by photolithography.

Then, referring to FIG. 21C, the overcoat layer 4 is spin-coated to be about 2.0 μm thick. An ITO film is sputtered on the overcoat layer 4 to be about 300 nm thick, and then patterned.

Then, referring to FIG. 21D, the polymer walls 6 for orienting the liquid crystal molecules in axial symmetry are provided by spin-coating a material to be about 3.0 μm thick, and transferring a predetermined pattern by photolithography. Each polymer wall 6 has a width of about 40 μm and an inclination angle of about 40°.

Then, referring to FIG. 21E, the pillar-like protrusions 7a, which define the cell gap, are formed to be about 3.0 μm thick on the polymer walls 6. The cell gap is defined by the polymer walls 6 and the pillar like protrusions 7a to be about 6.0 μm.

Then, referring to FIG. 21F, the vertical alignment film 8 is formed on each of the substrate and the counter substrate, and the substrates are attached together. A liquid crystal material is injected into a gap between the substrates so as to form the liquid crystal region 9, thereby producing a liquid crystal cell.

Thus, the liquid crystal display device according to Comparative Example 1 requires the additional step of providing the pillar-like protrusions 7a.

In such a liquid crystal display device, any variation in the thickness of the applied pillar-like protrusion polymer material is a variation in the cell gap. Therefore, a region with a thickness varied from a predetermined thickness is likely to have a poor viewing angle characteristic and a reduced light transmission, or the like, whereby it is difficult to obtain desirable display characteristics.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
    a pair of substrates;
    a liquid crystal layer interposed between the pair of substrates; and
    a photo-polymerized polymer wall, formed on one of the pair of substrates, said photo-polymerized wall including a portion inclined at an angle sufficient to provide anchoring force for orienting molecules of said liquid crystal layer;
    a plurality of randomly dispersed spacer beads defining a thickness of said liquid crystal layer;
    wherein said photo-polymerized wall comprises a resin polymerized by a proximity exposure process;
    wherein the thickness of the liquid crystal layer defined by said spacer beads is greater than a height of the polymer wall; and
    wherein a top portion of the polymer wall is an inclined region.

2. A liquid crystal display device according to claim 1, wherein the spacer beads are provided on the polymer wall.

3. A liquid crystal display device according to claim 1, wherein a top portion of the polymer wall is a flat region.

4. A liquid crystal display device according to claim 1, wherein the spacer beads are colored.

5. A liquid crystal display device according to claim 1, wherein the polymer wall is made of a photosensitive resin.

6. A liquid crystal display device according to claim 5, wherein the photosensitive resin is of a negative type.

7. A liquid crystal display device according to claim 1, wherein the polymer wall is made of a transparent material.

8. A liquid crystal display device according to claim 1, wherein the spacer beads are made of a transparent material.

9. A liquid crystal display device according to claim 1, wherein the spacer beads are secured while being partially buried in the polymer wall.

10. A liquid crystal display device according to claim 1, wherein the polymer wall includes a portion which is acute-angle-tapered or inclined with respect to one of the substrates.

11. A liquid crystal display device according to claim 1, wherein an angle of the inclined portion is about 5° to about 45° with respect to one of the substrates.

12. A liquid crystal display device according to claim 1, wherein a width of the polymer wall is equal to or greater than about twice as much as a diameter of one of the spacer beads.

13. A liquid crystal display device according to claim 1, wherein the spacer beads are provided in a region where there is no polymer wall.

14. A liquid crystal display according to claim 1, wherein an inclination angle of the inclined region is about 10° or more with respect to the substrate.

15. A liquid crystal display device according to claim 1, wherein each of the spacer beads has an adhesive layer on a surface thereof.

* * * * *